US012718682B2

United States Patent
(12) United States Patent
McNicholas

(10) Patent No.: US 12,718,682 B2
(45) Date of Patent: Aug. 25, 2026

(54) VAPOR DISPLACEMENT REFUELING INCLUDING DATA COMMUNICATIONS, ZERO GRAVITY AND CHEMICAL LOOPING COMBUSTION SYSTEM

(71) Applicant: Daniel McNicholas, Palos Park, IL (US)

(72) Inventor: Daniel McNicholas, Palos Park, IL (US)

(*) Notice: Subject to any disclaimer, the term of this patent is extended or adjusted under 35 U.S.C. 154(b) by 0 days.

(21) Appl. No.: 18/271,302

(22) PCT Filed: Feb. 23, 2022

(86) PCT No.: PCT/US2022/017426
§ 371 (c)(1),
(2) Date: Jul. 7, 2023

(87) PCT Pub. No.: WO2022/150798
PCT Pub. Date: Jul. 14, 2022

(65) Prior Publication Data
US 2024/0060462 A1 Feb. 22, 2024

(51) Int. Cl.
*G08C 25/00* (2006.01)
*B01D 46/04* (2006.01)
(Continued)

(52) U.S. Cl.
CPC ............ *G08C 25/00* (2013.01); *B01D 46/04* (2013.01); *B01D 53/9431* (2013.01); *B04C 9/00* (2013.01); *B67D 7/04* (2013.01); *B67D 7/64* (2013.01); *B67D 7/78* (2013.01); *F01D 15/10* (2013.01); *F02M 27/00* (2013.01); *G08C 17/02* (2013.01);
(Continued)

(58) Field of Classification Search
CPC ........ G08C 25/00; G08C 17/02; G08C 19/00; G08C 2201/63; G07F 13/025; H04L 1/22
See application file for complete search history.

(56) References Cited

U.S. PATENT DOCUMENTS 6,128,551 A * 10/2000 Davis .................. G06Q 20/363 700/241
7,103,280 B1 * 9/2006 Ionov .................. H04B 10/118 398/118
(Continued)

*Primary Examiner* — Adnan Aziz
(74) *Attorney, Agent, or Firm* — Michael P. Mazza, LLC; Michael P. Mazza

(57) ABSTRACT

A multiply redundant safety system that protects humans and assets while transfer(s) and/or fueling of on road/off road, rail, marine, aircraft, spacecraft, rockets, and all other vehicles and/or vessels utilizing Compressed and or Liquefied Gas Fuels/compound(s). Utilizing Natural Gas Chemical Family of Hydrogen and/or Propane and/or ethane and/or ammonia and/or any mixtures along with or with out oxidizer(s), such as Liquefied Oxygen, Oxygen Triplet (O3) and/or ozone and/or hydrogen peroxide and/or peroxide and/or solid oxidizer(s) one or more processors, utilizing Artificial Intelligence techniques and/or machine learning in combination with one or more sensors; in combination with one or more micro switches and/or actuator(s) combine to detect any leaks and/or fire(s) and/or explosion hazards and/or vehicle motion and/or arcs, spark(s) and/or other hazards for quickly mitigating and/or locking out and/or stopping fueling and/or gas and/or transfers and/or vehicle releasing system(s).

10 Claims, 15 Drawing Sheets

(51) Int. Cl.

| | |
|---|---|
| ***B01D 53/94*** | (2006.01) |
| ***B04C 9/00*** | (2006.01) |
| ***B67D 7/04*** | (2010.01) |
| ***B67D 7/64*** | (2010.01) |
| ***B67D 7/78*** | (2010.01) |
| ***F01D 15/10*** | (2006.01) |
| ***F02M 27/00*** | (2006.01) |
| ***G08C 17/02*** | (2006.01) |
| ***G08C 19/00*** | (2006.01) |
| ***H01M 8/04007*** | (2016.01) |
| ***H01M 8/0606*** | (2016.01) |
| ***H01M 8/0612*** | (2016.01) |
| *F01N 3/20* | (2006.01) |

(52) U.S. Cl.

CPC ........ *G08C 19/00* (2013.01); *H01M 8/04074* (2013.01); *H01M 8/0606* (2013.01); *H01M 8/0618* (2013.01); *B04C 2009/002* (2013.01); *F01N 3/2066* (2013.01); *F01N 2610/02* (2013.01); *G08C 2201/63* (2013.01)

(56) References Cited

U.S. PATENT DOCUMENTS

| | | | | |
|---|---|---|---|---|
| 8,655,398 B2 * | 2/2014 | Levin | H04B 7/0837 | 455/524 |
| 8,773,236 B2 * | 7/2014 | Makhota | H04L 67/12 | 340/541 |
| 2002/0128988 A1 * | 9/2002 | Covington | G07F 5/18 | 700/282 |
| 2004/0153701 A1 * | 8/2004 | Pickell | H04L 1/22 | 714/4.4 |
| 2007/0265733 A1 * | 11/2007 | Harrell | G07F 13/025 | 700/283 |
| 2008/0064328 A1 * | 3/2008 | Wesel | H04B 7/195 | 455/13.3 |
| 2009/0321623 A1 * | 12/2009 | Ross | C09D 11/03 | 250/271 |
| 2015/0120476 A1 * | 4/2015 | Harrell | G06Q 30/0635 | 705/21 |
| 2021/0081932 A1 * | 3/2021 | Chau | G06Q 20/027 | |

* cited by examiner

VAPOR DISPLACEMENT REFUELING INCLUDING DATA COMMUNICATIONS, ZERO GRAVITY AND CHEMICAL LOOPING COMBUSTION SYSTEM

BACKGROUND

Field of the Invention

The present invention relates generally to refueling safety and more particularly to refueling safety for refueling land vehicles, barges, ships, spacecraft and any other type of vehicle. In particular, communications aspects of safety systems.

Description of the Problem Solved

Clean fuels are emerging globally. Natural Gas, Hydrogen, Propane, Ethane, and Ammonia plus derivatives and mixtures from Bio-methane and/or Hythane and/or Synthetic Gas and any gas supplied from algae. Cultivating algae is a promising clean fuel and/or fuel mixture to assist in lowering the carbon emissions. The planet earth's population keeps increasing, along with this Increase, is the fact that our Transportation and/or Work vehicles needs will also increase. Utilizing Clean, Safe, Natural Gas and/or Hydrogen and/or Propane and/or Ethane and/or Ammonia and/or it's derivatives and/or compounds will benefit all. The use of Bio-methane and/or Bio-gas alone or mixed with methane and/or Hydrogen mixed with methane (Hythene) has positive carbon reduction results. Landfills, farms, and municipal waste plants are all sources of Bio-gas. All of these fuel(s) and/or mixtures are an abundant source of fuel.

Safely fueling and or transferring compressed and or liquefied gaseous materials can be challenging, first they have a low vapor pressure, therefore to maintain liquid state they must be kept under pressure, and some require cryogenic temperature to maintain liquid state. These properties, cryogenic liquefied gas, require specialized handling and/or equipment to properly contain and/or transfer and/or fuel with, weather transfer and/or fueling system is onboard vehicle and/or vessel and/or land based. Safety is paramount, protecting life and asset must be the number one priority, and all parties from Government regulators, Insurance Industry, Suppliers, to end users need to understand the Safety culture necessary to handle compressed and/or liquefied gas fueling and/or transfer(s). Utilizing modern technology, such as Artificial and/or Synthetic Intelligence, with state of the art equipment, will diminish opportunity for accidents to occur. Clean emissions, from clean fuels, from clean safe transfers, will contribute to Clean Air for all.

There are also multiple different systems and/or paths for fuel consumption. The combustion engine has been vastly improved to increase efficiency and reduce emissions, now achieving near zero emissions. The vehicle emission reductions, when quantified, are substantial, and clean fuels are a key component of the reductions. There are also turbines and/or micro-turbines, rotary engines, and various types of fuel cells. Fuel cell efficiency as well as internal combustion, may also be improved with increased oxygen % percentage (s) of system intake. Oxygen and/or Natural Gas and/or Hydrogen and/or Propane and/or ethane and/or ammonia (NGHPETA and/or O) may be separated, and or produced onboard or it may be supplied as a compressed and/or liquefied gas; also, any onboard reformer and/or gas cleaving and/or separation process onboard is also within the scope of this invention; such as stripping H2 out from CH-4, by high temp. and/or steam cracking and/or reformer on the vehicle, for use as fuel and/or fuel-compound and/or oxidizer.

SUMMARY OF THE INVENTION

The present invention relates to fueling safety systems and more particularly to communications in such systems. The use of communications and networks is critical in fueling safety. Networks may be local area networks (LAN) or Wide and/or remote networks (WAN). Modern communication systems more available, private and/or leased communication system(s) will benefit Gas and/or Liquefied Gas transfer systems with protections from cyber-crimes. Satellite systems can provide the privacy, and redundancy, for example, the means of fiber re-routing during times of interference such as weather events. Switching, both by route, and method, coax and/or coax R.F. and/or RFoF and/or Radio and/or light and/or OWC provides redundant methods, and/or routes to gather and/or analyze and/or live stream video and/or information and/or data about clients, shipments, transfers, durations, delays, volume(s), safety systems, operations systems, operational safety status, vehicle information, arrival times, possible bottlenecking, and many more data points and/or data information related to liquefied and/or compressed gas transfers. Satellite communications systems is an excellent option for ships transiting the globe; and fueling and/or transfer(s) of liquefied and/or compressed gas may occur at sea, satellite communications can be by radio and/or optical and/or both standing alone and/or combined for robust communications.

Quantum computers and Quantum communications provide security and speed, both of which are necessary in our evolving data connected world. Artificial Intelligence, Synthetic Intelligence, machine learning, and voice activated commands all require large volumes of data recall, data processing, and algorithms to compute in real time, to produce tangible results, granted one of the main differences between todays binary computers and Quantum computing is the speed at which the Quantum Computer is capable of processing. Today's computers have difficulties processing at required speeds. Quantum computing is basically linear algebraic. The speed, is will increase machine learning and artificial intelligence programs to be able to operate in real time. Quantum Teleportation and/or Quantum data communications, Quantum Internet, sometimes referred to as QCOMM, or quantum internet, or quantum entangled qubits; via Qubit (has several names qbit, qubit, quantum bit) and/or Optical Qubit (Fiber Optic F.O.), and Photon Based Qubit (open and/or free space networks), Qubyte (equals eight Qubits), and qutrit (equals trit=ternary (computer). Quantum teleportation is a system for transferring quantum information from sender to receiver. Quantum teleportation and/or Quantum data communications are with-in the scope of this invention.

DESCRIPTION OF THE PREFERRED EMBODIMENTS

Figure 1:
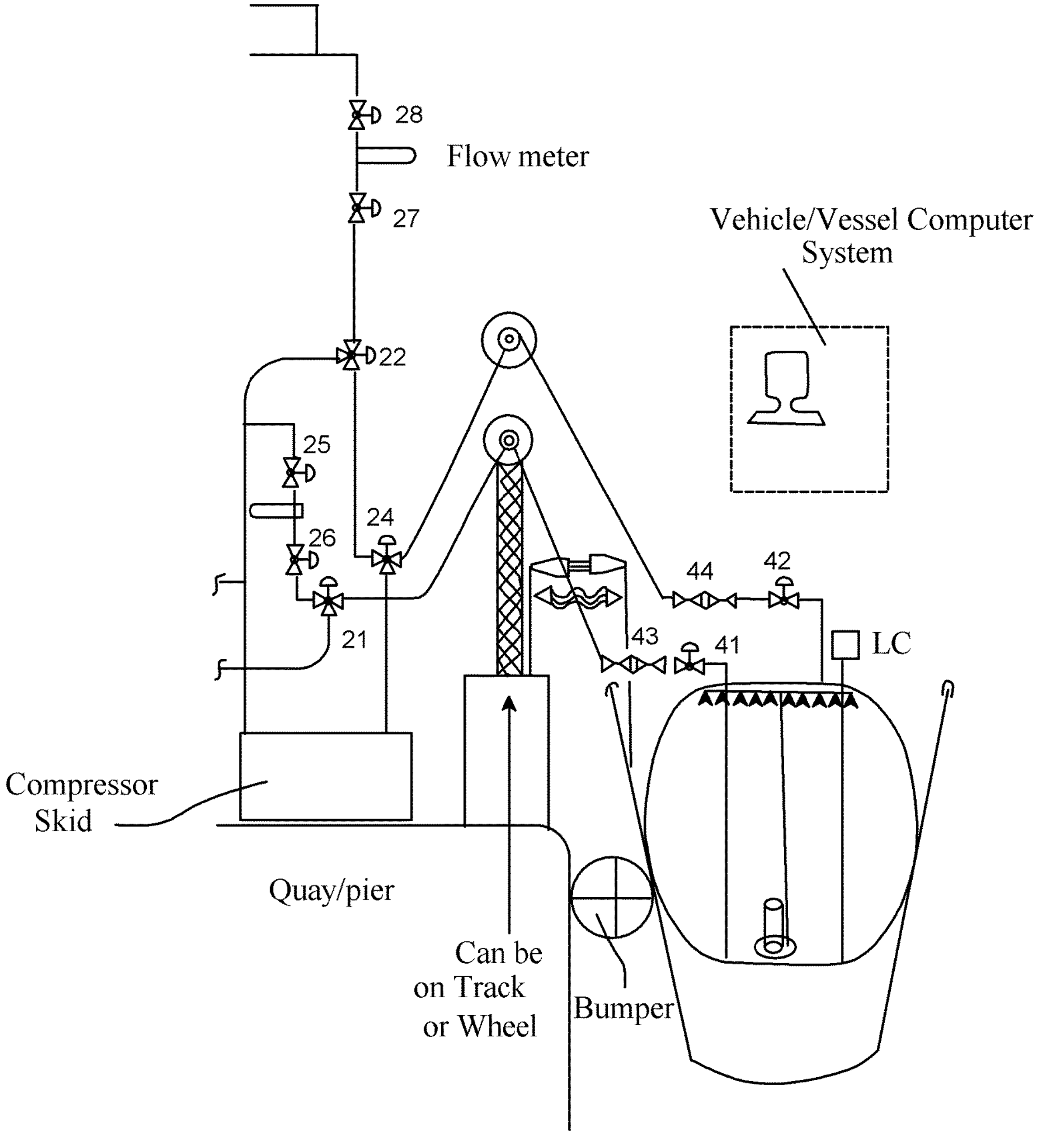
FIG. 1 shows a ship refueling system with valves.
Figure 2:
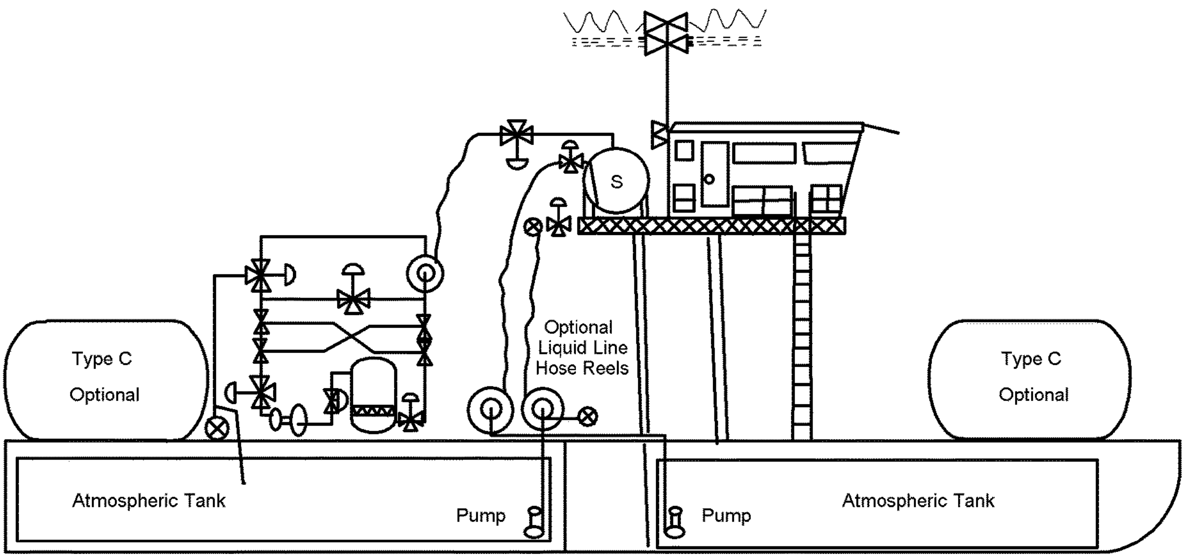
FIG. 2 shows a barge refueling system.
Figure 3:
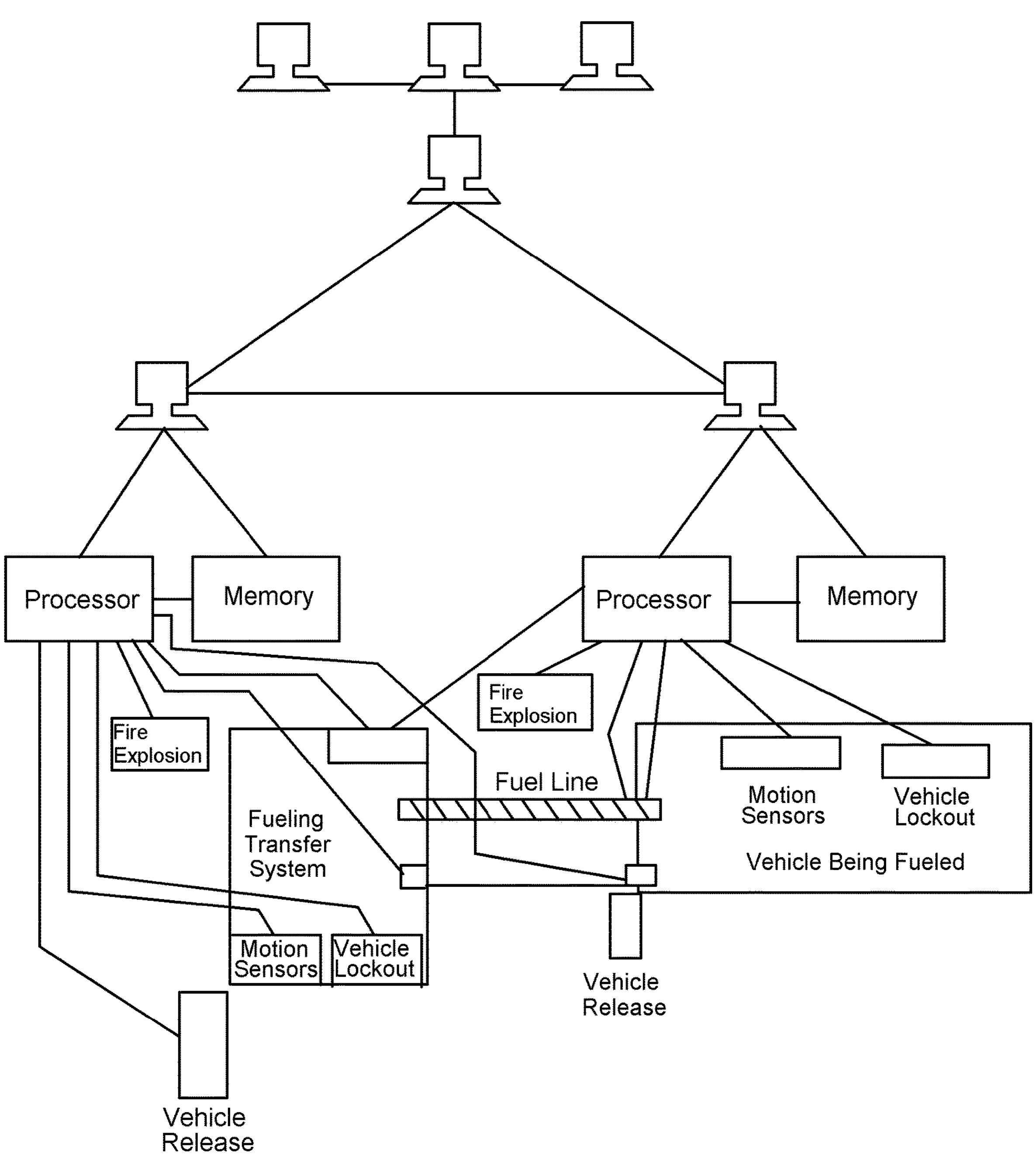
FIG. 3 shows a redundant fueling safety system.
Figure 4:
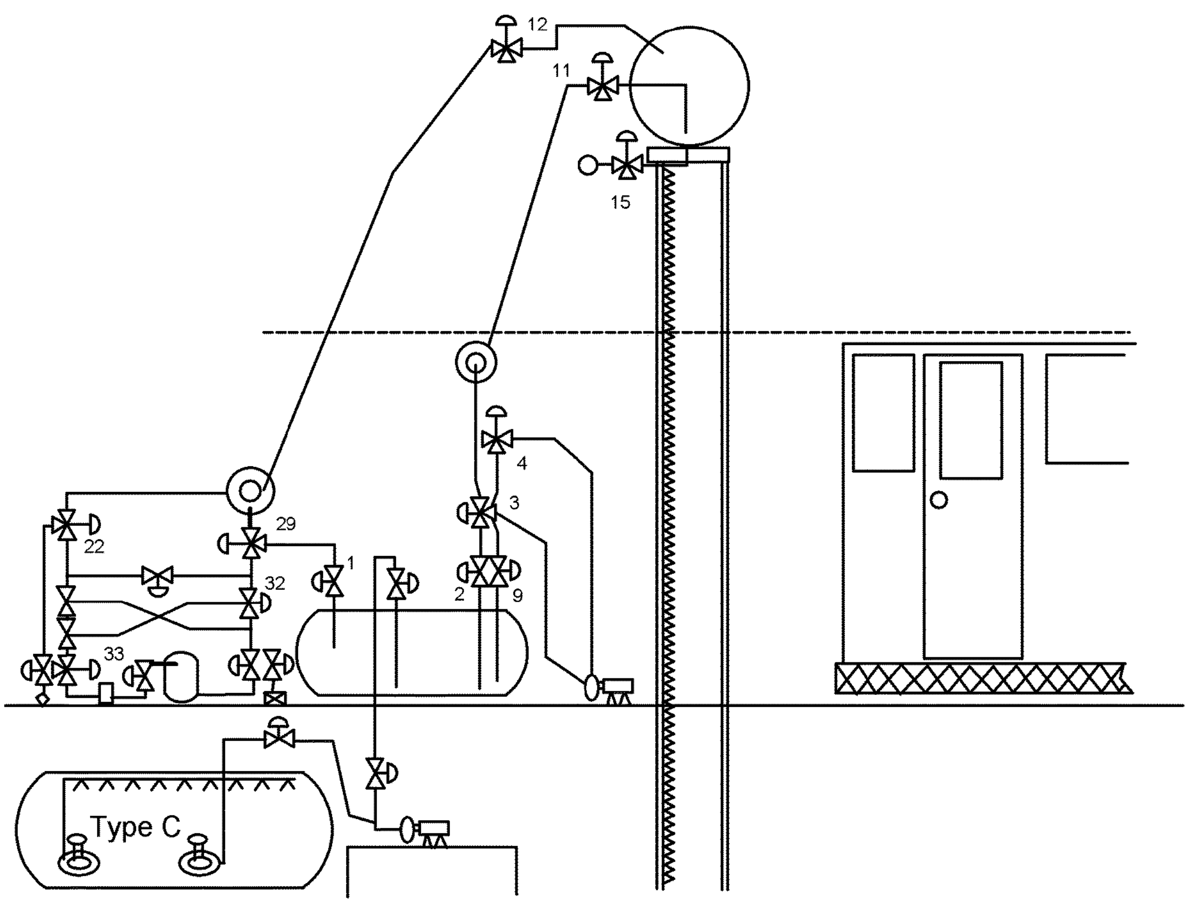
FIG. 4 shows a surge tank system with valves.
Figure 5:
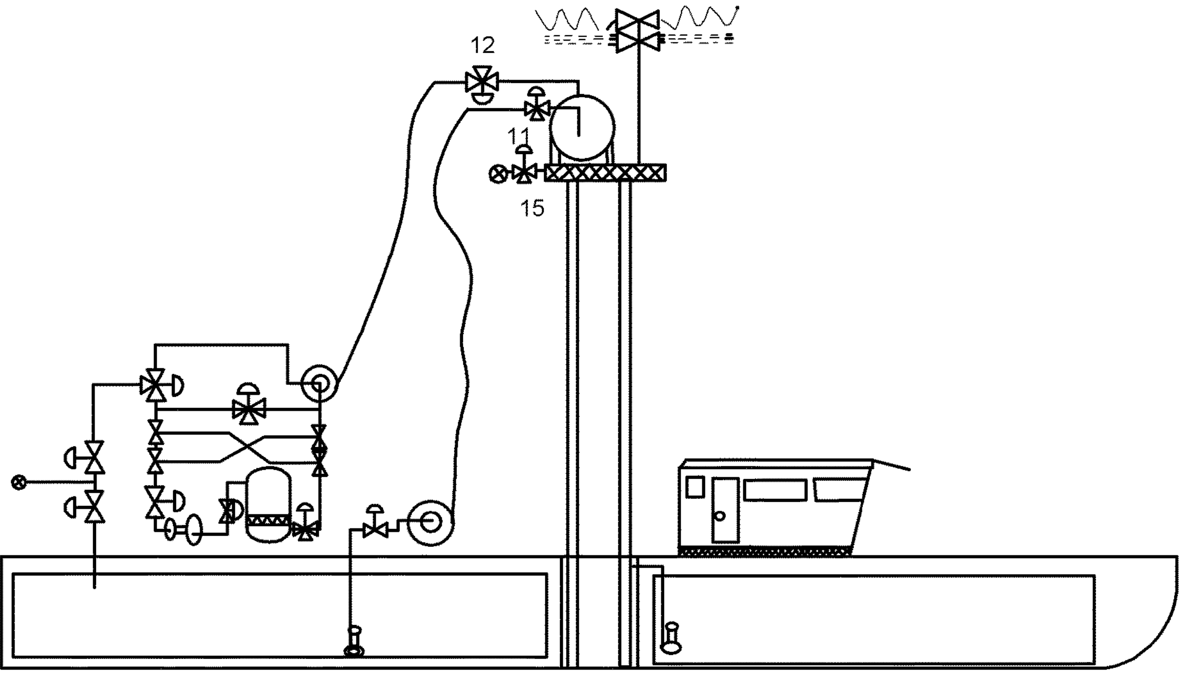
FIG. 5 shows an embodiment of a refueling system in an raised configuration.
Figure 6:
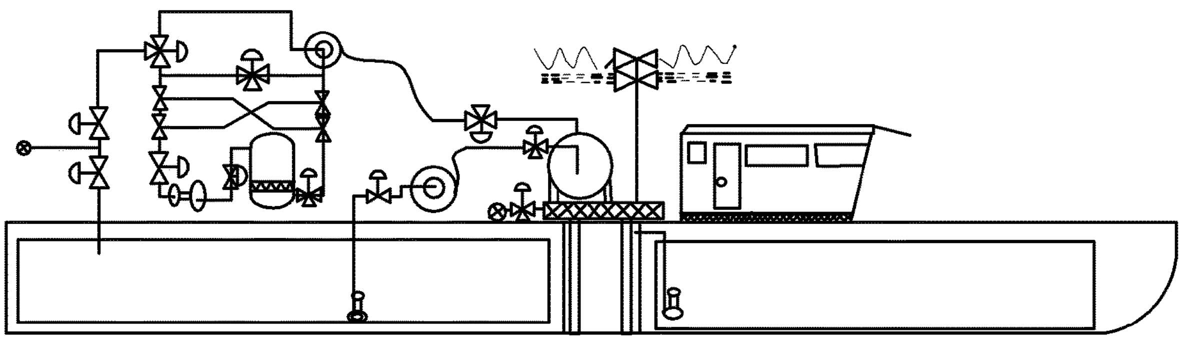
FIG. 6 shows an embodiment of a refueling system in a lowered configuration.
Figure 7:
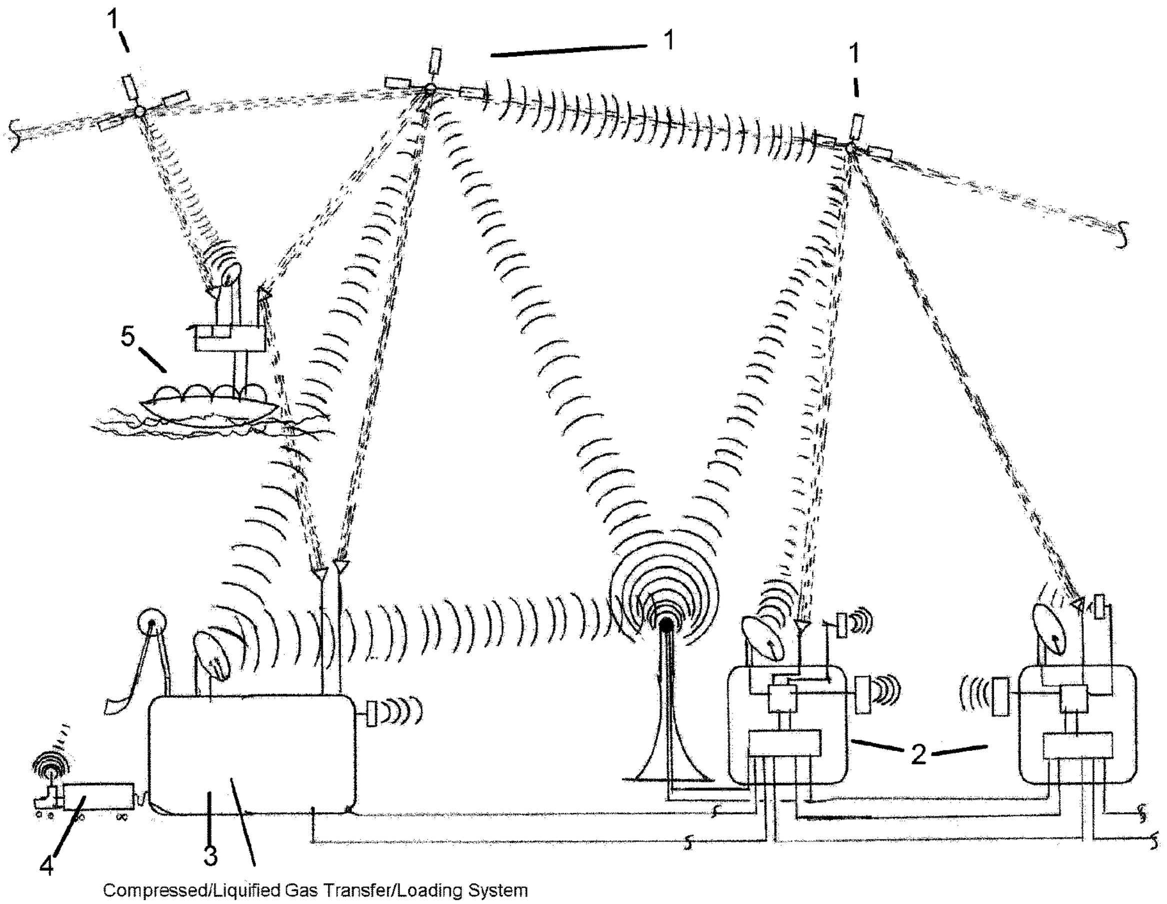
FIG. 7 shows a refueling communication network.
Figure 8:
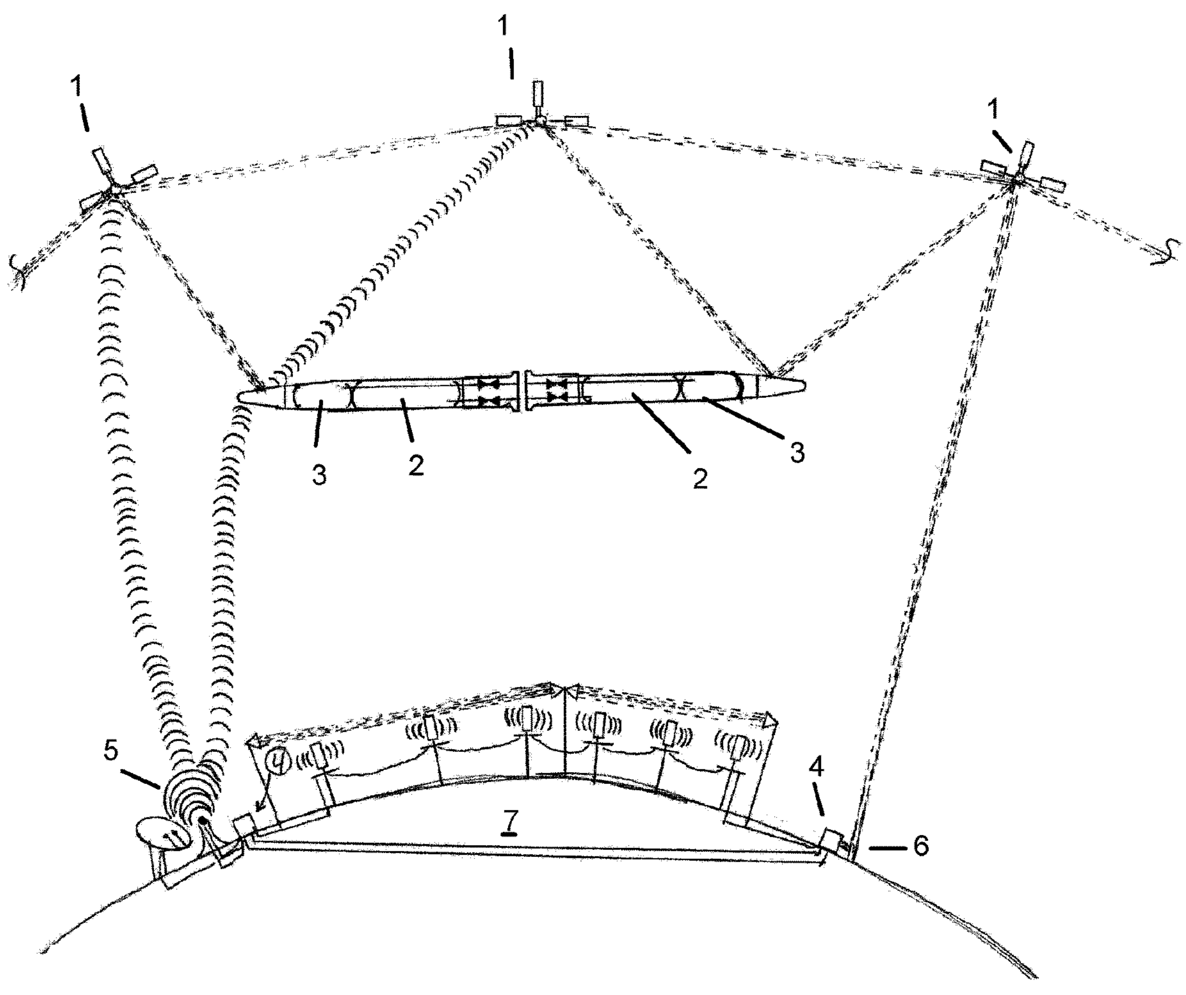
FIG. 8 shows a spacecraft refueling network.

The control system and/or computerized automated and/or semi-automated and/or manual system(s) will network locally and remotely, communication and/or data communications may be achieved by wire and/or coax and/or coax R.F. and/or RFoF and/or wirelessly by radio and/or light; such as Optical wirelessly communications, (OWC) and/or any combination of the listed methods. This includes fiber optic cables, fiber optic sensor(s), radio and/or optical communication and/or data interfaces, radio waves, coax, coax R.F., radio to optical conversions, optical to radio conversions, data to radio conversions, radio to data, any local radio and/or optical transmissions and/or receivers, Radio Frequency over Optical (RFoF) and/or any light transmissions and/or receivers, multiple frequencies, multiple wavelengths, multiple combinations of light and/or radio, between fueling and/or transfer(s) system, land based, and vehicle(s) or vehicle to vehicle, if fueling system is on a vessel. Plus, utilizing a voting and/or polling program and/or system; whereby three communications and/or methods may be utilized, for example two radio signals (different frequencies) and a hard-wire or fiber optic back up, if any one fails, the other two are voted and/or polled to ensure communications are valid; system(s) continues operations; if two communication of the three are lost, voting and/or polling will signal an interruption, thus a signal out put; and an ESD emergency shut-down trip will occur. The voting and/or polling by 2 and/or 3 two of three communication link(s) must be active, this will reduce spurious trips, and communication errors. Any combination of wired and/or wirelessly by radio and/or light may be included in the voting and/or polling proof of communication system functioning system. Also, Transmission Control Protocol and/or Internet Protocol TCP and/or IP is dependable, robust, communications and may also serve alone or in parallel, for communication and/or information data transmission and/or receiving.

Networks may be local area networks (LAN) or Wide and/or remote networks (WAN). Modern communication systems more available, private and/or leased communication system(s) will benefit Gas and/or Liquefied Gas transfer systems with protections from cyber-crimes. Satellite systems can provide the privacy, and redundancy, for example, the means of fiber re-routing during times of interference such as weather events. Switching, both by route, and method, coax and/or coax R.F. and/or RFoF and/or Radio and/or light and/or OWC provides redundant methods, and/or routes to gather and/or analyze and/or live stream video and/or information and/or data about clients, shipments, transfers, durations, delays, volume(s), safety systems, operations systems, operational safety status, vehicle information, arrival times, possible bottlenecking, and many more data points and/or data information related to liquefied and/or compressed gas transfers. Satellite communications systems is an excellent option for ships transiting the globe; and fueling and/or transfer(s) of liquefied and/or compressed gas may occur at sea, satellite communications can be by radio and/or optical and/or both standing alone and/or combined for robust communications.

The control system and/or transfer area and/or vehicle and/or vessels may have adjustable antennae for radio and/or light transmission and/or reception. The adjustable antennae can be manual and/or automatic, the antennae and/or dish and/or transmitter and/or receiver may be local and/or remote communications such as by satellite and/or vehicle to vehicle. This will be advantageous for signal strength during communications. Proper communications will benefit all parties with back-up and/or uninterrupted communications.

State of the art transfers will include the use of Artificial Intelligence, Machine learning, or Deep learning utilizing high speed imaging or the use of digital high speed camera (s); photodiode and/or array sensors that include both the visual and non-visual spectrum (such as I.R.) to input photo imaging into processors for deep processor learning or "Machine learning". Repetitive vehicle and/or vessel fueling and/or transfers can benefit, data recall will inform system(s) and/or files, on physical data, as well as preparation documentation and check-list, and more. Repetitive motions, Steps, or processes are "Learned" by processor, and repetitive actions and/or responses are then learned and acted upon as learned. Other Optical, magnetic, and ultrasonic inputs are also included in the body of this invention. Deep learning utilizes one or more inputs for algorithms to process information inputs, then learns (deep learning) the inputs and outputs required to perform the and/or multiple task(s) and/or task, thereby creating its own step by step "code and/or coding and/or Flowcharting". Deep learning and/or machine learning may be performed by Graphic Processor (s) Units but can also utilize Quantum computing on a Quantum bus or network. Quantum logic gates and networks are safer due to validation process capabilities within the system. Quantum networks may be LAN (local area networks) or they may be WAN (wide area networks) wirelessly connected to multiple different networking systems via satellite by Radio and/or fiber optic links and/or optical wireless networks and/or and/or any combination of radio and/or light. Analog or digital signals are both conditioned and fed, which are processed into complex algorithms which decipher input signals and determine precise outputs for repetitive and/or motions and/or actions, and quantum and/or GPUPU(s) computing enhanced with optical and/or coax and/or coax R.F. and/or RFoF (Radio Frequency over Fiber Optic) network(s) and/or computing with high bandwidth on the bus and/or network, computing at speeds in which these sophisticated algorithms compute in real time, therefore allowing the artificial intelligence to function at high real time speed. Having an array of GPU and/or GPUPU and/or Quantum processors (including linear array) is also with-in the scope of this invention, or any standard binary processor (s). Also any computer system that may communicate with the processor(s) such as graphics processors (GPU) plus GPUPU-graphics processing unit with processing unit(s). Sensors such as accelerometer (optical or magnetic) with three dimension (tri-axial accelerometer(s)) motion, and/or multiple accelerometers coupled to a processor to compute three dimensional motion(s) and/or inertial motion unit(s) for detection and/or signaling omni-vector motion and/or movement and/or distances, on land and/or at sea, plus photodiodes and/or arrays and/or Infrared photodiodes and/or arrays with high speed photo capabilities, and/or optical (filtered) high speed imaging with Infrared capabilities, which utilizes analog or digital imaging as an input. Cellular Visual Micro processing and/or Digital image processing and/or camera image processing may also be utilized for inputs.

Many different systems and components make up complex compressed and/or liquefied gas fueling and/or transfer (s), they all participate and/or communicate in a intelligent control system and/or network. Inputs and/or outputs, such as electrical starters, contactor(s), transfer switches, transformer(s), inverter(s), UPS systems(s)-w and/or bypass, batteries (stacks and/or bank(s)) relay(s) (multiple design, style, contacts, voltages, poles, coils) auxiliary relays and/or contact(s), ampere(s) detector, voltage detector(s), actuator (s), processor(s), micro-controller(s), remote terminal unit (s), computers, computer peripherals (mouse, touch screen, monitor(s), keyboard and/or keypad (magnetic and/or optical) magnetic reader, optical reader, mouse (optical and/or magnetic), Track and/or roller ball (mouse), joy-stick, controller, microphone, printer(s), Ink cartridges, monitor(s), display(s), speaker(s)), power supply, central processing unit (CPU), sequencer and/or micro-sequencer, hard drives, power supplies, main boards, optical and/or magnetic drives, optical and/or magnetic readers, graphics processing unit (GPU), general purpose graphics processing unit-(GPGPU), external GPU (EGPU), integrated graphics processing unit (s) (IGPU), memory, hard drive, flash drive, cd and/or dvd drive, modem, router(s), software, firmware, application software, App's, operating system(s), cloud storage, cloud computing, application programming interface (A.P.I.), web servers, cloud distributed network, remote terminal unit, remote telemetry unit, remote tele-control unit, distributed control system (D.C.S.), nodes, module(s), bandwidth, network bandwidth, data bandwidth, digital bandwidth, Supervisory control and data acquisition (SCADA), master system, master data base, information system(s), Bridging (network, computer networks and/or interface(s), computer cluster, grid computer, super computer, quantum computing, "quant" computer, VIOP and/or telephone(s), servers, crossover cable, antennae (line of site and omni-directional, radio transceiver(s), optical wireless communications (OWC), OWC Ultra-short range, OWC short range, OWC medium range, OWC Long range, OWC Ultra-long range, Radio waves to mechanical vibration and/or oscillations to optical conversions and/or vise-versa and/or radio frequency over fiber (RFoF), light modulated by a radio frequency signal and transmitter over fiber optic link and/or cable, Intermediate frequency (IF-over fiber) (lower radio freq.), Fiber to the antenna (FTTA) an optical to electrical (O and/or E) converter, Satellite Communications on L-Band frequency range, Satellite Communications on Ka band, fiber optic amplifier(s), sectorized antenna, omni-directional antenna and/or system and/or processor(s) and/or controller(s) networks and/or data transmission network(s), internet, eithernet, extranet, wide area networks, local area networks, wired networks, wireless network(s), optical networks, coaxial and/or (RF-coaxial) networks, buss network, network cable (s), fiber optic cable(s), satellite radio and/or optical and/or combined, network(s), radio network, radio and/or optical networks combined, cellular network(s) (2G, 3G, 4G, 5G, 6G, CMDA), TCP and/or IP protocol networks, WiFi network(s), computer system interface(s), cloud computing, operating system(s), Module(s), distributed control system (s), remote terminal unit(s), fire detection system(s), motion system(s), gas detection system(s), explosion detection system(s), vehicle lock-out(s), compressed and/or liquefied gas fueling and/or transfer system(s) and/or apparatus: (pumps, exchangers, evaporators, compressors, valves (various styles and/or specifications), controllers, Gas Combustion units, flares, knock-out and/or surge drum, vacuum pump(s), instrumentation, power supplies, tank(s), pipe, fittings, hoses, connectors, flow-meter(s), insulation (vacuum jacket) system(s), vehicle release system(s), fueling and/or transfer line(s) release system(s), seismic detection system(s) and/or sensor(s).

The fueling and/or transfer systems may utilize and/or be configured to utilize multiple different programs and/or learned programs, such as evolutionary algorithms, algorithms, differential evolution, automated planning and scheduling, automated reasoning, automation, speech recognition, speaker recognition, image processing, intelligent word recognition, object recognition, optical mark recognition, silent speech interface, Hybrid intelligence system(s), intelligent agent, intelligent control data mining, process mining, information extraction, image recognition, image retrieval, deep learning, are all facets of artificial intelligence (A.I.) or synthetic Intelligence.

The use of Artificial Intelligence for repetitive motions performed for a Natural Gas Chemical Family and/or Hydrogen and/or Propane and/or ethane and/or ammonia Vehicle fueling events are within the scope of this invention, such as, automated planning and scheduling, automated reasoning, automation, speech recognition, speaker recognition, image processing, intelligent word recognition, object recognition, photodiode and/or photodiode array, fiber optic imaging and/or High speed camera, high speed imagery, Hybrids, I.R., artificial vision, LIDAR, acoustical and/or ultrasonic mark and/or recognition, optical mark recognition, silent speech interface, Hybrid intelligence system(s), intelligent agent, intelligent control data mining, process mining, information extraction, image recognition, image retrieval, deep learning, which includes location positioning and/or 3-dimensional positioning, mapping, GPS and/or Cellular Positioning systems, tank positioning, mooring, tether line, and/or tethering, LVDT and/or rotary encoder detecting for mooring, anchoring, docking, parking, positioning, elevation, depth, distances, movements, motions, of vehicle (weather wheeled, tracked, Barge (mechanized), ship, spacecraft, aircraft, or rocket). Also included are repetitive motions for fueling connections, weather it be the coupler, rotating coupler, coupler locking mechanism, articulating arm, rotating arm, extension, rotating extension, connector, rotating connector, sliding arm and/or connector, rotating sliding arm and/or connection, bridge, articulating bridge, with sliding or rotating base and/or tank and/or manifold elevation. Artificial Intelligence capabilities will insure safe Natural Gas chemical family vehicle and/or tank positions and/or elevations, and/or hydrogen and/or propane and/or ethane and/or ammonia connections to repeat with safe accurate transfers each and every fueling event. Sensors such as magnetic, optical, and ultrasonic will provide inputs, outputs, and feedback signals for the processor and/or s to compute locations and/or positions of the fueling tank(s) and/or connector(s) via networked data transmission(s). Signals such as Torque, strain and/or gage, force, light (visible or non visible) (OWC)—Optical wireless communications, and communicate these inputs by wire, bus duct, wirelessly, via radio and/or light and/or fiber optic and/or coax and/or cable and/or coax R.F. cable and/or RFoF and/or any combination there-of to and/or from processor and/or s and/or system network. The processor(s) will respond from input(s), (learning) intelligently, utilizing A.I. retrieval and/or recognition (Images) to respond with signal(s) and outputs which will automatically function as learned and/or programmed to provide safe fueling connection(s) with vehicle; or not, and provide feedback signals for further information processing. Such as informing operations: "Proper Connection Successfully Made" or "Failure due to A, B, or C error"; of which further action may be necessary by human interface, such as manual (human) assist with a joystick and/or controller and/or peripheral device.

Vehicle lock-out is any means and/or method to disable the vehicle from movement and/or motion during fueling and/or transfer event. This includes, transmission and/or ignition and/or mooring and/or parking and/or docking devices, including A.I. input(s) and/or positioning (GPS and/or Cellular positioning) and/or motion detection by optical and/or ultrasonic sensor(s) standing alone and/or combined or simply accelerometer(s) and/or tri-axial accelerometer(s) coupled to processor(s) to computer motion, or by radio and/or light and/or mechanical and/or electrical device such as tether to switch and/or series circuit detection device. The system may be activated manually and/or automatically once a vehicle is positioned and/or any optical, magnetic, ultrasonic sensor(s); some may indicate vehicle position and/or compartment and/or lid and/or door and/or connection to fueling and/or transfer system is detected, and/or simply by operator input.

To detect omni-directional vehicular movement and/or distances and/or motion(s), multiple sensor(s) may be utilized to perform different functions, standing alone and/or in a cascading control system to perform a fueling and/or transfer lock-out (and/or release) and/or automatic fueling and/or transfer line release and/or disconnect and/or vehicle lock-out release. The use of one or more micro-switches, combine to automatically mitigate excess movement and/or motion(s) by initiation of fueling and/or transfer(s) lock-out system, closing isolation valves (or diverting flow, with vehicle(s) flow isolated) to prevent and/or disable fuel flow and/or transfer(s). The use of one or more sensor(s) such as optical and/or ultrasonic that detect motion and/or movement and/or excessive motion and/or movement (above or greater than predetermined stop limit(s), can be sensor(s) such as laser and/or radar measurement sensor(s) and/or accelerometer(s) and/or tri-axial accelerometer(s) coupled to processing units to compute motion(s), and/or inertial motion unit(s) and/or simply gyro(s)—(optical and/or magnetic and/or ultrasonic) and/or MEMS device(s) and/or mechanical gyro(s). The use of one or more of these sensor(s), or possibly multiple sensor(s) creates the safest condition to stop and/or mitigate fuel and/or transfer(s), by maintaining other systems in a lock-out state, and activating audible and/or visual alarms. The fuel flow system may be re-activated by an operator, if proper operational conditions have been met. Different vehicles may require different parameters to initiate such motion and/or fueling and/or transfer system lock-outs. Such as, for example; a barge, that has a surge tank, with variable tank elevation and/or elevator(s), which raises and lowers tank (for bridge clearance(s) and/or the benefit of head space vapor push with gravity assist), may require additional motion detection at the surge tank level; the surge tank level (elevation) is variable, and thus, when fueling and/or transferring has liquid level inside tank, (subject to internal sloshing), thus when tank is elevated, it will be subjected to amplified motion(s) of pitch, roll, and yaw. Motion detector(s), are paramount for safety, the vehicle and/or vessel and/or barge may become unstable with an elevated surge tank with compressed and/or liquefied gas with-in; and thus, predetermined stop limits, of motion (all axis's) beyond which, will signal and/or relay and/or trigger fueling and/or transfer shut-down and/or fuel and/or transfer line system release, so that tank may be lowered and/or automatically lowered for over-all system safety (lower center of gravity) until conditions improve and/or cease. Sensor(s), which detect tank elevation, such as magnetic, optical, and ultrasonic, can detect tank elevations, and may additionally detect when surge tank is in "Home" and/or ground "base" position, and further devices may detect if a locking (automatic) mechanism (optional), utilized to secure surge tank to deck, is activated and/or de-activated. Also, optionally the surge tank elevator(s) may operate independently (separate from the pilot house) and be elevated and/or lowered; and in this case a distinct transmission lock-out shall be provided, such that the vehicle is rendered incapable of moving by it's own power while surge tank is elevated and/or raised off "Home" and/or base. Motion(s) and/or elevator(s) operation and/or detection device(s) shall communicate signal(s) by wire and/or wirelessly by radio and/or light and/or OWC and/or RFoF and/or any combination of wire, (coax and/or coax R.F.) and/or wirelessly, by radio and/or light, for the network communications and/or signal(s) with processor(s) detection system and/or microcontroller and/or processor and/or locally or remote system(s).

Fueling and/or transfer(s) system lock-out(s), is any means or techniques to prevent and/or stop and/or mitigate a fueling and/or transfer event. Several sensor(s) and/or system(s) have the ability and/or input and/or output and capability to stop fueling and/or transfer(s). Multiple system(s), to mitigate fueling and/or transfer(s), is by Process Shut-down and/or Stop, button device(s); (optional color: yellow and/or red mushroom button) device, to close and/or (divert) the flow path with isolation valve(s) and/or stop pump(s) and/or compressor(s) and/or and/or in some systems designed to isolate vehicle(s) and to re-direct flow by (3-way; 4-way, or multi-port valve(s), to one of ordinary skill in the art will realize other input(s) and/or output(s) to create a safe fueling and/or transfer lock-out, which will be indicated by audible and or visual, both on the Human Interface and in transfer zone to alert all, of a fueling and/or transfer lock-out, which may, in certain situations, be re-established by an operator (re-set and/or re-start) after situation is corrected. Visual alerts include, Human Interface screen (computer monitor(s) and/or touch screen(s) banners of flashing yellow, red, xenon; or intrinsically safe light and/or strobe of yellow, red, or xenon. The fueling and/or transfer system lock-out(s) sensor(s) and/or system(s) may communicate signal(s) by wire and/or wirelessly by radio and/or light and/or OWC and/or RFoF and/or any combination of wire, (coax and/or coax R.F.) and/or RFoF and/or wirelessly, by radio and/or light, for the network communications and/or signal(s) with processor(s) detection system and/or microcontroller and/or processor and/or locally or remote system(s).

The system(s)' power supply shall be reliable and robust, safest will be two (2) separate power sources and/or feeds, redundant feeds will decrease power outage, and associated problems. Automatic transfer switching to be provided, to enhance reliability. Individual transformers, and uninterrupted power supplies (UPS) with battery back-up will also enhance system operations. Seamless transfer of power is crucial for liquefied and/or compressed gas fueling and/or transfer systems safety.

Land based fueling and/or transfer system(s) shall include Seismic system(s) for safety shut-down(s) in the event of predetermined seismic and/or motion set-point(s) achieved. Such motion, as an earth-quake and/or tectonic shifting. A Seismic survey, conducted in advance of site selection will identify zone(s) or areas which may be more prone to Seismic activity. The use of multiple accelerometer(s) and/or tri-axial accelerometer(s) coupled to processor(s) and/or inertial motion units, also other sensor(s) such as ultrasonic and/or optical devices, standing alone or combined, strategically located will enhance detection of Seismic events. These Seismic sensor(s) and/or systems will actively communicate with the network(s) of processor(s) and shall communicate and/or activate events by wired and/or wirelessly and/or by radio and/or light and/or OWC and/or RFoF and/or any combination of wire (coax and/or coax R.F.) and/or wirelessly by radio and/or light and/or OWC. Also, any Tsunami warnings and/or alert(s) and/or indications shall result in an immediate shut-down of fueling and/or transfer event, including transfer line(s) release, system purge, lowering of surge tank to "Home" base and secured; a complete wrap-up and stow; readied for departure to safe harbor.

Voice activated commands and/or controls (VAC), along with voice recognition and/or identification for intelligent system operations is with-in the scope of this invention. Utilizing A.I., VAC, will enable operations and/or systems to react rapidly when problems arise. Voice translators and/or speech and/or intelligent word recognition programs to flow chart and/or Deep learn and/or program responses to react by automated reasoning; efficiently, generally quicker than human reactions, to respond; A practiced and/or learned VAC of "FIRE"; will automatically understand, and activate the cascade of controls and/or systems to: stop fueling and/or transfers flows and/or pump(s) and/or compressor(s) and/or close and/or Isolate all valves for flow(s) and/or release fueling and/or transfer lines from vehicle; release vehicle lock-out(s); Liberate vehicle for operator control (movement); simultaneously starting fire pump(s) and/or fire suppression system(s) and/or relay-dispatch-auto dialer to fire department for assistance. Utilizing hearing and/or speech recognition, by head sets, along with Hybrid and/or A.I. intelligent systems, can speed reaction time, thus possibly saving lives and/or preventing further problems and/or damages. VAC can also be utilized for human interface and/or manual override to assist with fueling and/or transfer system connection; for example: "lower connection", "extend connection", "Clamp Connection" when optical and/or magnetic and/or ultrasonic target recognition is satisfied. Many functions can be "Machine Learned and/or Deep-learning" by image processing and/or data mining and/or object recognition, for operator assist and or fire safety. A.I. systems will improve and save lives and assets.

Monitoring and/or remote monitoring of compressed gas and/or liquefied gas transfer(s) and/or fueling events is useful for training and/or event review(s). Multiple monitor(s) and/or split screens (quad screens) and/or remote monitoring systems enable others with commercial interest to monitor actions. Camera(s), video and/or still, may be strategically located to record both visual and audio events. Camera(s) with night vision (I.R.) may also be utilized, for added security. Camera(s) may communicate by wire and/or wirelessly by radio and/or light and/or any combination of wire (coax and/or coax R.F.) and/or RFoF and/or wirelessly by radio and/or light and/or OWC. Camera system(s) will aid operations, as viewing and/or monitoring of system(s) previously unseen will provide "eye's" for human and/or asset protection.

Bio-metric identification, another form of Artificial Intelligence, may be utilized to authenticate individuals operating and/or re-setting fueling and/or transfer events. Unique Iris and/or facial and/or finger prints and/or recognition scanners may be optical and/or ultrasonic and/or magnetic any and/or any combination of. All personnel, will individually log onto computerized transfer system(s) to perform operations and/or manipulations of system(s) and/or resets, identifying each action by individual and/or speech recognition via VAC. These security features will ensure properly qualified operators are controlling fueling and/or transfers, and that only authorized individuals have access to system(s).

The HOST-Supplier tank, which can also be one of multiple "HOST-Supplier" tanks, which may include liquid and/or vapor manifolds for separate supply and/or receiving configurations, also the HOST TANK(S) can receive it's supply from another type "C" pressurized source, or it can receive compressed liquefied gas from an "atmospheric" tank(s). The compressed and/or liquefied gas source can be local, from a near-by plant, or it can receive via trucks and/or rail and/or barge and/or ship and/or tanker, also there may be an optional "Load Cell" and/or Weight station at the location for transfer measurements.

The advantages of this system is that it can be assembled in a relatively small footprint, and it greatly reduces vapor phasing, many times vapor phasing originates from pump(s) and/or it is the heat of compression and/or centrifugal and/or kinetic energy force that releases the composition, to change back to it's gaseous state, and this results in too much vapor-phasing, and thus is extremely difficult to measure and/or transfer. The vertical and/or horizontal surge tank, provides for gas and/or liquid separation, and pressurized and/or gravity feed provides liquid measurement and/or transfer and/or fueling to receiver tank(s), which very beneficial to both parties.

Also included with-in the system is a liquid nitrogen tank, evaporator, and distribution system to provide both liquid and vaporized nitrogen to "Vapor Displacement" transfer system. The liquid LN2 is useful for system cool-down at start-up; as stated it drops system temperature, in advance of refrigerated liquefied gas introduction, thus reducing vapor phasing of product. Vaporized nitrogen is utilized for post transfer and/or fueling event to inert the system.

Oxygen content detection system(s) with separate power sources, measures O2 level in HOST tank, any supply tank(s) and/or any receiving tank(s) and/or transfer system. The sensor(s) can be electro-chemical detector and/or paramagnetic with magnetic and/or optical detection sensor(s), system(s) shall enable and/or trigger and/or relay and/or signal on predetermined measure of oxygen (enriched and/or deficient) with-in fueling and/or transfers system a shut-down. The oxygen sensor(s) and/or system(s) may communicate signal(s) by wire and/or wirelessly by radio and/or light and/or and/or any combination of wire (coax and/or coax R.F.) and/or RFoF and/or wirelessly by radio and/or light and/or OWC, for network communications and/or signal(s) with central detection system and/or microcontroller and/or processor(s) and/or processor and/or locally or remote system.

Parallel, (2), isolated and/or separate hydraulic system(s) with accumulator(s), plus High and/or low pressure sensor(s), with separate power source(s), failure shall trigger and/or relay and/or signal a fueling and/or transfer system lock-out, the pressure sensor(s) and/or system(s) may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally or remote.

Any arc, lightening, spark, static electric, or arcing of any kind in the transfer zone shall initiate a system Emergency STOP-SHUTDOWN. This condition is not acceptable in the transfer zone. An optical system capable of arc detection; even low energy arcing, will trigger and/or relay a signal that arcing and/or lightening is present and trigger an E-Stop-Shutdown event, and idle the transfer system until situation is either corrected, or weather improves.

Static electric arcing also a valid danger for compressed gas and/or liquefied gas fueling and/or transfer(s), proper grounding system(s), with indications and/or interlocks will afford additional layer safety, by indication of non-grounding. A ground monitoring system that is interlocked with shut-down system, to verify proper ground(s) are functioning, is with-in this invention to ensure safety, system(s) may communicate signal(s) by wire and/or wirelessly by radio and/or light and/or and/or any combination of wire (coax and/or coax R.F and/or RFoF and/or wirelessly by radio and/or light and/or OWC, for network communications and/or signal(s) with central detection system and/or microcontroller and/or processor and/or locally or remote.

A vacuum system, which evacuates the transfer lines is also an option. This will evacuate the system of any residual liquid and/or gas and/or vapor, and transfer the gas to the Gas Combustion Unit and/or Thermal Oxidizer for proper disposal. The now negative pressure system, which can also indicate any system leaks, by negative pressure infiltration, is ready for nitrogen gas "Blanketing"; thus keeping an "oxygen free" system, ready for next cool-down cycle, system(s) may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally or remote.

A vacuum monitoring system, consisting of compound gauges (vacuum and/or positive pressure), will be for type "C" tanks with sealed jacket and/or vacuum insulated metal jacket. This will provide signal for indication of a tank and/or jacket leak, this signal, relay, trigger an alarm for further review by operations.

Gas leak detection systems are mandatory for compressed and/or liquefied gas fueling and/or transfer(s). Multiple methods and techniques are available. Electrochemical and/or optical and/or catalytic bead and/or heated wire methods can acquire sample by passive or pumped methods. Such as point detection, which can use local and/or remote cells (sample gas may be pumped to remote panel and/or cabinet) or passively collected for gas detection. Another type is referred to as "Open Path" method, a strategically placed optical path passes a light beam between transmitter and a receiver, the light differential is calculated into a "Gas level %" base on which gas is being measured. This is good for measuring across a distance. The best coverage is to utilize one or more methods, standing alone and/or combined to provide robust gas detection system coverage. The system(s) may communicate signal(s) by wire and/or wirelessly by radio and/or light and/or OWC and/or RFoF and/or any combination of wire, (coax and/or coax R.F.) and/or wirelessly, by radio and/or light, for the network communications and/or signal(s) with processor(s) detection system and/or microcontroller and/or processor and/or locally or remote system(s).

Isolation Valves:

Proper isolation valve design, lay-out, and installation is paramount to a safe fueling and/or transfer system. There are many different styles, combinations, and applications for different types of Isolation valves. Many isolation valves are control valves, some are manual, some are control valves with manual override, some are self-regulating. There are many different control valve operators, such as air operated, spring operated, electric operated, temperature operated, hydraulic operated, and pressure operated, to name a few. These operators can be configured in many different ways, such as; air to open, air to close, fail to open, fail to closed, spring pressure to open, spring pressure to close, reversing contactors and/or relays to open and/or close; different hydraulic and/or pressure(s), Hydraulic power to open and/or Hydraulic power to close and/or multiple pressure regulators, (spring and/or weights) set points for self and/or pilot and/or internal D and/or P regulation and/or relief and/or lifting, to name a few.

There are also different valve port isolation and flow arrangements; for many different applications, such as 2-way, 3-way, and 4-way, reversing valve(s) and multi-port valves. These are utilized in system specific lay-outs; such as a recycle system, looping, diverting, and by-passing applications along with two, three, four, or multi-ports utilized for isolating and/or recirculating flow. A liquefied and/or compressed and/or gas fueling and/or transfer system can benefit from certain valve design lay-outs. Such as utilization of a recycle and/or diverting and/or by-pass and/or multi-port and/or Isolation valve(s) in the supplier and/or receiver and/or liquid and/or vapor line(s) outside the "interface and/or between" line(s). In one concept, avoiding line pressure surge by diverting the gas and/or Liquefied gas to one of several optional routes, while isolation to supplier and/or receiver is obtained. The diverted and/or by-passed and/or re-cycled and/or looped flow may be to a recycle line, a surge or knock-out drum, a gas combustion unit, or if there is an onboard evaporator, the flow may be diverted to evaporators' fuel feed line for vehicle consumption. PRV=Relief and/or Reducing and/or Regulating: multiple names; different applications, same initials (P.R.V).

Pressure relief valves (PRV's) and/or Pressure regulating valves (PRV's), may also be categorized as ISOLATION Valve(s), Pressure Relief valves can be operated by pressure, temperature, or both. For example, millions of homes in North America have hot water heaters (electric or gas), but they all have a Temperature and/or pressure relief isolation valve, keeping the water in the tank, and only "relieving" when another system malfunction has occurred, such as high water pressure and/or high water temperature and/or both; It is at this time that the "Relief Valve" activates and isolation ceases, and water is "relieved" onto floor and/or drain to save the water heater tank from possible rupture. The P.R.V. will passively protect the water tank and/or house and/or business for long periods of time, only activating when excess temperature and/or pressure and/or both exist. Another type of P.R.V. is the pressure regulating valve, which is also an isolation valve that has many different applications. It can be controlled by system pressure using a "Pilot Valve and/or line" or "Internal Pressure Differential", or a P.L.C. program. These pressure regulating valves also act as isolation valves, as they are also one direction for flow. For example, if you have two (2) Isolating valves closed with a cryogenic liquid locked between them; the system shall require some form of "Pressure Relief and/or Regulation" due to naturally occurring thermal expansion between the (2) isolation valves. A Pressure Regulating Valve, with a pilot regulator and/or internal differential pressure (D.P.) regulating isolation valve can sense a higher than normal internal pressure (in this example the cryogenic material between (2) isolation valves), activate itself, thus breaking the isolation it normally provided and reduce the pressure created by naturally occurring thermal expansion, this Pressure regulating valve will continue to operate until pressure created by thermal expansion no longer exceeds its operating and/or activating pressure set point and/or until system is back to normal operating conditions and the cryogenic media stops pressure build-up and/or other and/or all media is removed from the system, or simply a pressure relief valve for hydraulic liquid lock-in between valves. Relief and/or regulation shall be piped to knock-out drum for further safe processing.

Some valves can have the same initials, such as P.R.V.; perform similar isolation duties, but have different activating mechanisms (springs and/or weights versus differential pressure and/or pilot valve and/or line pressure) and different names (Pressure Relief Valve vs. Pressure Reducing Valve vs. Pressure regulating valve) plus various material and/or internal composition(s).

All of the fueling and/or transfer(s) System valves and/or 2-way and/or 3-way and/or 4-way and/or multi-port valve, reversing, recycling valve(s) will have Independent Positive Position Feedback Positioners and/or P.P.F.B. The P.P.F.B., is an independent and/or separate signal to and/or from a PLC and/or DCS and/or processor(s)' valve(s)' output supplied signal, which relays back the indicated valve position. The control system shall include a program to compare valve(s) output signal(s) to the P.P.F.B. signal(s) to verify a corresponding value. This redundant verification of the corresponding signals, provides positive proof of valve position and/or port location and/or not thus, reduces manageable risk to a greater acceptable level, thus increasing operational fueling and/or transfer(s) safety by orders of magnitude, system(s) may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally or remote.

As one can understand, there are many multiple Isolation valve combinations for a fueling and/or transfer and/or gas system of supplier side and/or receiver side. A line diagram and/or schematic will demonstrate several arrangements, to show multiple connecting(s) of Isolation valve(s) plus orientations and/or designs. The diagrams FIGS. #1-2 and 3-6 display few of the vast valve configurations possible for vapor displacement transfer system, with a pump (operated by level control of surge tank) to aid for high flow transfer(s).

The following is a multiple step by step; valve number to valve number, flow paths, using the basic flow schematic attached to make a general description of the compressed and/or liquefied gas flows:

Supplier (HOST Tank "A") Tank to Vehicle and/or Barge and/or Ship and/or Tanker (receiver) Tank (no pump):

System cool-down completed; compressor is started-discharge vapor flow from receiver tank thru #42-thru #44-thru #24-thru-#35-thru-#34 thru-#33 thru-#22 thru-#27-thru-#28-thru #13-thru #1-into "HOST "A" Supplier" tank for pressurization; Liquid flow from "HOST "A" Supplier" tank flow #2-thru-#11-thru #15-thru #25-thru-#26-thru #21-thru #43-thru #41 liquid flow into Barge and/or Ship and/or Tanker "Receiver" Tank.

In case of a shut-down: compressor is stopped, Valves #41, 42, 33, 34, 35 are Closed; #36, #23 are opened; and #24 diverts ports (isolation of receiving tank); #15, #25, #26, #2 will remain open for gravity liquid drain back to Host "A" supplier tank; #21 is diverted, the flow to Barge and/or Ship and/or Tanker receiving tank is isolated, and the flow is diverted to HOST "A" supply tank thru #2; after level indicator for Surge tank indicates empty (no Liquid level) and CMF indicates zero flow the #2 HOST "A" supply tank valve is closed and/or isolated.

There are two (2) compressor re-cycle paths with-in this system. First is the valve #36, upon over pressure or other upset valve #36 will open and gas path will begin looping, therefore no longer providing differential pressure to system. Another gas path re-cycle loop, can be identified as passing thru #33 thru #22 thru #23 thru #24 thru #35 thru #34 and looping; thus no longer providing differential pressure to system, an operator will identify cause of looping, any may re-set when proper conditions are achieved.

A pump(s), may be utilized to transfer liquid from HOST TANK "A" up to Surge tank; the pump(s) may be variable speed, and will be controlled by level indicator and/or controller from surge tank level, this may assist with Higher flow and/or fast filling applications.

Components such as "Vee-Ball" control valves, duel pressure xmtrs, and duel temperature xmtrs both up and down stream of CMF devices, to provide exact back-pressure, to keep product from vapor-phasing. A micro-controller, configured for bi-directional flow, will utilize inputs such as temperature(s), pressure(s), density(s), to produce a computed flow, and provide proper back pressure to limit vapor phasing of product.

The attached schematic(s) display only the concept(s), they not a blue-print(s), many different versions, with different valve(s) and/or option(s) and/or tank(s) and/or compressor(s) and/or (optional) pump(s), piping arrangements and/or designs are with-in the scope of this invention. Many re-arrangements of components, utilizing different number(s), or number of valves and/or types, locations of compressor(s), Tanks, valves, all to achieve vapor headspace push of compressed and/or liquefied gas fueling and/or transfer(s) is with-in the scope of this invention. Such as an optional tank "Boot"; also some tanks have bottom connections (holding tanks in drawing have NO bottom connections, for safety). May contain more than one HOST Tank (supply or receiving tank(s) A, B, C, D . . . ). The innovative process of Vapor head space displacement and/or pressurization for transfer(s) of liquefied gaseous products, such as; natural gas, propane, hydrogen, ethane, ammonia liquefied gases, is with-in the scope of this invention.

In this invention, the fueling and/or transfer system apparatus utilizes head space vapor push method, for Type "C" Pressurized tank(s), which is beneficial for fuel(s) that have vapor phasing qualities, this system reduces vapor phasing and makes handling and fuel flow measurement less challenging. The HOST supplier tank, the receiver tank, and the surge tank between them, plus a plethora of control valves, including 2-way and/or 3-way and/or P.R.V.'s, and control valve(s) strategically placed will allow Bi-Directional Fueling and/or Transfer(s), and measurements. The fueling and/or transfer flow(s) is generally from HOST supplier system and/or tank(s) to vehicle(s), although from time to time the vehicle tank requires evacuation, or possibly a large quantity feeder to the supplier tank(s), such as bulk-break supplies to the supplier; therefore this system version, has capabilities to flow and/or supply and/or feed from vehicle and/or barge and/or ship and/or truck and/or plant to feed into HOST- "supplier" tank(s). Strategically placed valve(s) will allow Bi-Directional transfer(s) utilizing compressed gas (the gaseous state of which ever chemical composition of fuel is being transferred), pressurizing (pushing) on feeding Type "C" tank head-space, and compressor suction from receiving tank; the surge tank provides vertical and/or horizontal liquid and/or gas separation and elevation provides for gravity assist, for pressurizing and/or pushing during fueling and/or transfer event, and to drain surge tank. This version of the transfer system will be 100% contained, and safeties in place to relieve system in the event of an upset. Multiple, strategically located pressure relief valves, will provide pressure relief, when needed, and pass the higher liquid and/or vapor pressure to a knock-out drum and/or Gas combustion and/or Thermal Oxidizer unit for proper disposal.

If fueling and/or transfer system is onboard a vehicle and/or vessel and/or barge and/or ship the HOST Tank can be optional, and the surge tank may be utilized as Host supply tank with filling from an atmospheric onboard tank, below deck and/or Type "C" (above and/or below deck). In this version, of the invention, the surge tank combines with features of the supply tank; such as level controller operating the (optional variable speed drive) pumped liquefied gas supply from atmospheric and/or "C" tank below into the surge tank. Another innovative feature; is that the Type "C" tank can be hydraulically and/or mechanically and/or electrically elevated onboard, and locked into an elevated position, during fueling and/or transfer event. This feature is also advantageous for multiple geographies, transport(s) with lower bridges, and lower elevation clearances, will require any on-board apparatus to allow for clearance, automatic clearance monitoring of bridge and/or river level fluctuations is crucial. Combining vapor-head space pressure with gravity assist, will enhance fueling and/or transfer(s), and by lowering tank back to deck level after fueling and/or transfer event, and securely re-locking onto deck and/or below deck prior to vessel movement. Hydraulic and/or mechanical and/or electrical and/or any combination of the three; raising and/or elevating the tank(s), may be from deck level or below, and can be automatically monitored by rotary encoder and/or optical and/or ultrasonic and/or magnetic technology sensing. To an elevation necessary, to utilize vapor head-space push, with-out vaporizing the liquid during the transfer and/or fueling event; surge tank outlet elevation shall vary according to receiver tank manifold elevation. The raising and lowering of the surge tank (empty during raising and/or lowering; exemption of an emergency) can be possible by rated flexible approved hoses strategically attached by either draping on deck and/or un-coiled and/or rolled and/or distributed and/or re-rolled onto hose(s) multiple reels. This allows proper flow(s) of vapor(s) and/or liquefied gas(s) from variable elevation(s) of surge tank, and all liquefied and/or compressed gas(s) are safely contained. The tank variable elevation system, will change the center of vessel and/or vehicle gravity. Elevated structure and/or tank motions will be enhanced, and liquid(s) will slosh; this shall require review and/or approval of regulatory authorities. This elevated surge tank system may require a re-liquefier to accept fueling and/or transfer(s) from a pressurized source to an atmospheric tank, but atmospheric tank to atmospheric tank transfer and/or fueling is possible. Also, optionally, if the Pilot house is hydraulically and/or mechanically and/or electrically raised and lowered; the surge tank may be supported by and/or on the same, hydraulic and/or mechanical and/or electric or any combination of the three hoisting system(s). Keeping tank elevation just below peak of pilot house clearance, and utilizing pilot house ultrasonic and/or radar and/or optical and/or lidar clearance and/or crash avoidance systems to maintain proper bridge clearance for both pilot house and tank and/or fueling and/or transfer system is with-in the scope of this invention, plus all communications system(s) may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally or remote.

Fire and/or explosion(s) of any type during fueling and/or transfer(s) is also a danger signal that all fueling and/or transfer(s) shall cease operation. To detect hazardous fire conditions, the use of one or more sensor(s) standing alone or combined, in combination with one or more micro-switches, can combine to automatically initiate the fueling and/or transfer system lock-out, to prevent and/or stop fueling and/or transfer pumps, compressor(s), close (isolate) fuel flow valves, and activate fire alarms, fire pumps and/or suppression systems, and relay fire condition to fire department. Sensor(s) such as optical or magnetic can detect infrared, ultraviolet, heat, rate of rise in temperature. Any fire and/or flame scanner or laser sensor(s), fusible and/or friable links standing alone system(s) may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally or remote. or combined are all with-in the scope of this invention. Such devices and/or system(s) can detect and activate fire alarms.

To prevent enhancement of further fire or explosion hazards, an optional relay or digital or analog logic function and/or micro-switch(s) and/or relay, that is activated by a fire detection system or explosion detection system and/or device(s) to provide and/or produce a signal and/or trigger and/or relay to enable and/or release fueling and/or transfer line release system and/or vehicle lock-out release system; thus liberating the vehicle for operator control, to remove itself from fire source, or away to distance itself from further spreading fire or explosions, weather another vehicle is present or fueling and/or transfers are taking place from a fixed storage vessel and/or tank. Optical sensor(s) such as infrared and/or ultraviolet individually and/or combined can sense heat and/or fire, also sensor(s) such as rate of rise in temperature and ionization can detect excessive temperature and smoke. Fusible and/or friable links plus other sensor(s) such as acoustical and/or ultrasonic and/or infrasonic system(s) and/or receiver(s) can detect loud sudden noises and/or waves (sound and/or pressure) such as those created by a rapid expansion of molecules in a confined environment, and/or explosion(s). Any sensor activation will initiate the fueling and/or transfer lock-out system, plus activate and/or de-activate the fuel and/or transfer line release system, plus activate and/or deactivate the vehicle lock-out to liberate the vehicle for operator control of the vehicle(s). All of the sensor(s) and/or processor(s) and/or system(s) may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally or remote.

All motion and/or fire and/or heat sensor(s) are generally coupled to a processor. The processor executes stored instructions from memory, and makes decisions using artificial intelligence techniques to determine a course of action, as stated, the action might be just a fueling and/or transfer(s) shut-down or it might be a complete disconnect of the fueling and/or transfer system from the vehicle, and vehicle lock-out release; liberating the vehicle for operator control. The sensor(s) and/or and/or processor(s) may be part of the fueling and/or transfer supply system apparatus or they can be on the vehicle and/or vessel or both, system(s) may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally or remote.

The use of optical sensor(s) such as infrared temperature or fiber optic sensor(s) to detect presence or absence of a liquefied cryogenic temperature and/or temperature differential, which can determine the presence or absence in fueling and/or transfer lines, and thus a relay or digital or analog logic function and/or signal and/or combined to produce a vehicle lock-out. These can also be flow switches and/or flow meter(s) with transmitters which can communicate with system(s) and/or may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally or remote.

The use of magnetic sensor(s); such as magnetometer(s), Coriolis flow meters, (u-tube), density meter(s), linear variable differential transformers (LVDT), strain gauges, or mass flow (temperature and/or pressure compensated flow) plus other methods of detecting flow are with-in the scope of this invention. The listed sensor(s) sense the presence of a liquefied gas and/or connection between a fueling and/or transfer system and a vehicle. These sensor(s), standing alone and/or combined produce a signal and/or relay, analog or digital, or logic function to produce a signal for operation of safe vehicle fueling and/or transfer. Magnetic sensor(s) can detect the presence of a liquefied gas hose in proximity to tank fill adapter and/or valve and/or fitting. All of the sensor(s) may have transmitters that communicate with system(s) and/or may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally or remote.

The use of ultrasonic sensor(s) such as flow meter(s), which can be an external type that clamps-on or monitors from exterior of flow line or it can measure flow internally (submersed) is also with-in the scope of this invention. Also, any other method that utilizes ultrasonic and/or radar and/or other waves for detection are with-in the scope of this invention. Such as guided wire radar (radar on a cable and/or rope), this method is for tank level measurements, it can also detect multiple liquid levels, for phase differential detection, very good for liquefied gas tank level measurements. Ultrasonic sensor(s) sense the presence of a liquefied gas hose in proximity to a tank fill adapter and/or valve and/or fitting. Ultrasonic sensor(s) may sense and/or guide manual and/or automatic and/or semi-automatic fueling and/or transfer system(s) to sense proximity; or that a particular mechanical part is and/or is not in a particular position; such as a fueling and/or transfer rack, tray, arm, hose, articulation, extension of hose-line, coupler, locking coupler, rotating coupler, travel and/or slew(ing), or fueling and/or transfer devices and/or connections. All of the sensor(s) may have xmtrs that communicate with system(s) and/or may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally or remote.

The use of optical sensor(s), such as infrared, ultraviolet, laser, fiber optic, visible and/or non visible light to detect the presence of a liquefied gas fill hose in proximity to a tank fill adapter and/or fitting and/or valve is with-in the scope of the present invention. The sensor(s) can measure interference of a light beam, obstruction, light differential, existence or non existence, proximity, and weather a mechanical part is and/or is not in a particular position, such as a fueling and/or transfer rack, tray, arm, hose, articulation, extension of hose-line, coupler, locking coupler, rotating coupler, travel and/or slew(ing), or fueling and/or transfer devices and/or connections. All of the sensor(s) may have transmitters that communicate with system(s) and/or may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally or remote.

The system contains many different flow paths and/or tank(s) and/or piping arrangements, therefore any and/or all temperature and/or pressure and/or flow measurement devices used to sense, and/or control the liquefied gas fueling and/or transfer(s) by vapor displacement are with-in the scope of this invention. All of the sensor(s) may have transmitters that communicate with system(s) and/or may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally or remote.

Vehicle and/or Vessel mooring system(s) may also be incorporated, in whole or part, for detection of motion and/or excessive motion. Sensor(s) such as optical, magnetic, and ultrasonic standing alone and/or any combination of sensor(s) may be utilized. Sensor(s) such as linear variable differential transformers (LVDT) and/or Strain gauges and/or rotary encoder(s) and/or torsion and/or torque and/or gauging are all with-in the scope of this invention. These system(s) may also utilize A.I. system(s), such as A.I. vision and/or photodiode and/or arrays and/or phototransistor and/or arrays and/or High speed camera(s) and/or fiber optic imagery and/or Hybrids and/or Fiber optic Sensor(s) and/or high speed imagery; sensor(s) may be utilized to detect movement and/or motion of mooring systems beyond a predetermined set-point. These mooring system(s) may also be part of the vehicle release system (triggered by fire and/or explosion and/or highly excessive motion event (which is detected by omni-directional motion sensor(s); (optical and/or ultrasonic and/or magnetic motion devices). System(s) and/or devices may utilize communication networks by multiple methods, may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally and/or remote.

Also, all the safety systems, operator's, sensor(s), relays, controller(s), micro-controller(s) triggers, micro-switches, over-rides, lock-outs, reset(s), video's, and events shall be continuously recorded, all logic and/or data will be Identified and have current date and time stamps recorded. Data, events, video's, and all records will be available for viewing and/or print out, locally or remotely. Data can be transmitted by wire and/or wirelessly by radio and/or light and/or any combination of the three, and can be transmitted via private and/or leased network(s) for cyber-security, or it may be transmitted TCP and/or IP, or intranet and/or extranet, or satellite network and/or with back-routing capability.

The following is a list of system components:

- The supplier HOST tank is a Type "C", pressure vessel with strategically located liquid transfer (optional dip tube(s)).
- The receiver tank is a Type "C", pressure vessel with strategically located liquid transfer (optional dip tube (s)).
- The Surge Tank is a Type "C", pressure vessel with strategically located liquid transfer (optional dip tube (s)).
- Compressor(s), for vapor head space pressure pumping; may use one or more compressor(s) (optional VFD)
- Pump(s), for liquefied gas transfer from HOST supply tank(s) to surge drum (optional VFD)
- Knock-out and/or Flare Drum (vessel), for system relief, to the Gas Combustion Unit(s) and/or T.O. and/or Flare
- Vacuum pump system (optional) to evacuate system; into Knock-out drum
- Nitrogen Tank (LN2) for cool-down and/or purge system (s) and/or inerting
- De-Mister and/or Compressor Suction accumulator Tank.
- Gas Combustion Unit
- Flare
- Thermal Oxidizer
- Inerting System and/or Cool Down and/or Purge System by Liquid Nitrogen (LN2)
- Control System: DCS and/or Modules and/or Microcontroller(s) and/or remote terminal unit(s) and/or processor(s) and/or memory
- Light and/or Optical and/or Fiber optic and/or radio and/or wired and/or any combination of the three for communication system
- Instrumentation:
  - HOST "A"
  - Supply Tank: (per Tank) pressure transmitters (xmtr)-compound gauge; vacuum+pressure
    - (per tank) Isolation control valve(s) One for each liquid line and/or vapor line
    - (per tank) Level xmtrs
    - (per tank) High and/or High-High Level Floats (optional)
    - (per tank) three or more temp. xmtrs (vertically spaced)
    - (per tank) three or more analyzer taps (optional)
    - (per tank) oxygen detector(s)
    - (per tank) insulation jacket vacuum monitoring (optional type "c" with vacuum jacket)
- Receiving Tank: (per tank) pressure xmtr(s)-compound gauge; vacuum+pressure
  - (per tank) Isolation control valve(s) (one for each vapor and one for each Liquid line)
  - (per tank) Level xmtrs
  - (per tank) High-High Level Floats (optional)
  - (per Tank) three or more temp xmtrs (vertically spaced)
  - (per tank) three or more analyzer taps (optional)
  - (per tank) oxygen detector(s)
  - (per tank) insulation jacket vacuum monitoring (optional type "C" with vacuum jacket)
  - Surge Tank: (per tank) pressure xmtrs-compound gauge; vacuum+pressure
    - (per tank) Isolation control valve(s) (one for each vapor and one for each Liquid line)
    - (per tank) Level xmtrs
    - (per tank) High-High Level Floats (optional)
    - (per tank) three or more temp xmtrs (vertically spaced)
    - (per tank) oxygen detector(s)
    - (per tank) insulation jacket vacuum monitoring (optional Type "C" with vacuum jacket)
- De-Mister Tank: (per tank) pressure xmtrs-compound gauge; vacuum+pressure
  - (per tank) isolation control valve(s) (one for vapor and one for Liquid line)
  - (per tank) differential pressure xmtrs (optional switches)
  - (per tank) level float xmtrs (optional switches) (1-Hi liquid and/or 1-Hi-Hi Liquid level)
  - (per tank) one blow-down valve (automatic) plus one manual block valve
  - (per tank) one manual blow down valve (2 in-line block valves)
  - (per tank) oxygen detector(s)
- Knock-out Tank: (per tank) pressure xmtrs
  - (per tank) Isolation control valve(s) (one for vapor and one for Liquid line)
  - (per tank) level xmtrs
  - (per tank) high-High level floats (optional)
  - (per tank) three or more temp xmtrs (vertically spaces)
  - (per tank) one blow-down valve (automatic) plus one manual block valve
  - (per tank) one manual blow down valve (2 in-line block valves)
  - (per tank) oxygen detector(s)
  - Compressor: May be centrifugal, reciprocal, screw, rotary, or positive displacement
    - (optional) Variable Frequency Drive
    - (per Comp) Low pressure xmtr and/or Cut-outs (compressor inlet pressure Low and/or Low-Low)
    - (per Comp) High Pressure xmtr and/or Cut-outs (compressor inlet pressure Hi and/or Hi-Hi)
    - (per Comp) duel reversing valves (for compressor flow reversing)
    - (per Comp) Re-cycle valve
- Optional Fuel
- Liquid Pump: (optional) Variable Frequency Drive
  - (per pump) pressure xmtrs and/or L.P.C.O and/or H.P.C.O.
  - (per pump) d and/or p xmtrs and/or switches
  - (per pump) strainer and/or filter
  - (per pump) (optional) Flow meter
- Optional Spray
- Re-circ. Pump: Internally (tank(s)) Mounted and/or externally mounted.
- Flow Meter(s): Coreolis Bi-Directional flow meters (Magnetic and/or optical and/or ultrasonic internal measurement)

(2) Vee-Ball Valve(s) per CFM (control valves) for Bi-Directional back-pressure regulation.

(2) Pressure xmtrs and/or CFM (for Bi-directional mass flow pressure detection and/or compensation)

(2 Temp. xmtrs and/or CFM (for Bi-directional mass flow temp detection and/or compensation)

(Optional) Ultrasonic Bi-Directional Flow meters

Optional Flare and/or

Thermal Oxidizer

Flow Meter(s): (1) Coreolsis Bi-Directional flow meters (Magnetic and/or optical and/or ultrasonic internal measurement)

(2) Vee-Ball Valve(s) (control valves) for Bi-Directional back-pressure regulation.

(2) Pressure xmtrs (for Bi-directional mass flow pressure detection and/or compensation)

(2) Temp. xmtrs (for Bi-directional mass flow temp detection and/or compensation)

(1) Ultrasonic Bi-Directional Flow meters (can be internal and/or externally mounted for flow det.)

GCU and/or Flare and/or T.O.

Oxidizer: Isolation valve(s) for Thermal Oxidizer and/or Flare and/or G, C, U. Isolation pressure regulating valve (to reduce and/or regulate system pressure inlet to T.O.)

Filter System: Differential pressure xmtr and/or switch

Press. xmtrs; compound gauge; pressure+vacuum

Isolation valve and/or switch flow for composite duel filter unit.

Internally

Recirculating

System: Pumps per tank (Supply tank(s) and Receiving Tank(s).

Spray Bar(s) one and/or more per Tank(s) and/or Pump(s) and/or Spray Ball(s).

Raised Top Flanges Openings with cable and/or rod+packing gland for changing and/or pump elevation.

Eyelets on Top Flange(s) for lifting.

Inerting and/or LN2

System: Liquid Nitrogen storage tank(s)

Level xmtrs (liquid nitrogen volume available)

Pressure xmtrs (LN2) pressure

Isolation valves (automatic and/or Manual)

Control Valve(s) and/or metering flow into system

Optional flow meter (ultrasonic and/or diff.-Pressure and/or coreolsis)

The following list of major Control valves by system and/or components:

Supply Tank: Valve I.D. #1=HOST "A" Tank Vapor Isolation=2-way control valve Valve I.D. #2=HOST "A" Tank Liquid Isolation=2-Way Control valve Valve I.D. #3=HOST "A" Tank Liquid 3-way valve (liquid to pump suction and/or liquid to surge tank)

Valve I.D. #4=HOST "A" Tank Liquid 3-Way valve (liquid pump supply to HOST "A" tank and/or surge tank)

Valve I.D. #5=HOST "A" Supply Tank Liquid 2-way valve (liquid supply and/or recv to and/or from truck and/or rail)

Valve I.D. #6=HOST "A" Tank Liquid 2-way valve (liquid supplied feed; plant and/or atmospheric tank)

Valve I.D. #6_a_ and/or _b_=Vee-Balls for CMF from plant and/or atmospheric tank (optional)

Valve I.D. #7=HOST "A" Tank Vapor 2-Way valve (vapor from HOST "A" tank to re-liquefaction unit)

Valve I.D. #8=HOST "A" Tank Liquid-Common Liquid Header to HOST "B"-"C"-"D" or more . . .

Valve I.D. #9=HOST "A" Tank Liquid from valve #4 (pump discharge to surge and/or recirculation to tank)

Surge Tank: Valve I.D. #11=Surge Tank Liquid 2-Way Isolation=2-Way control valve Valve I.D. #12=Surge Tank Vapor 2-Way Isolation=2-way control valve Valve I.D. #13=Surge Tank Vapor 2-Way Isolation=2-Way control valve (Surge Tank By-Pass)

Valve I.D. #14=Surge Tank Vapor 2-Way Isolation=2-Way Control valve

Valve I.D. #15=Surge Tank Liquid 2-Way Isolation=2 Way Control Valve (Liq. To receiver and/or Host and/or rail)

Valve I.D #16=Surge Tank Vapor 2-Way Isolation=2Way control valve (surge tank to reliq. and/or GCU)

Transfer Line: Valve I.D. #21=Liquid Line 3-Way Isolation and/or recirculation from surge to Ship and/or Host tank and/or Rail Valve I.D #22=Vapor line 3-Way-Comp. disch. and/or suction to and/or from surge and/or host tank and/or Valve I.D. #23=Vapor Line 2-Way Isolation from surge tank and/or receiver tank and/or compressor-bypass Valve I.D. #24=Vapor Line 3-Way-Comp. suct. Ship receiver tank and/or comp. disch to surge tank Valve I.D. #25=Vee-Ball Throttling 2-Way Control Valve (Upstream Liquid line CFM)

Valve I.D. #26=Vee-Ball Throttling 2-Way Control Valve (Downstream Liquid line CFM)

Valve I.D. #27=Vee-Ball Throttling 2-Way Control Valve (Upstream Vapor Line CFM)

Valve I.D. #28=Vee-Ball Throttling 2-Way Control Valve (downstream Vapor Line CFM)

Compressor: Valve I.D. #31=Compressor Reversing Valve

Valve I.D. #32=Compressor Reversing Valve

Valve I.D. #33=Compressor Discharge Isolation 2-Way Control Valve

Valve I.D. #34=Compressor and/or De-Mister suction Isolation=2-Way control Valve Valve I.D. #35=De-Mister Tank suction Isolation Valve=2-Way Control Valve Valve I.D. #36=Compressor Recycle Valve Receiver Tank: Valve I.D. #41=Receiver Tank Liquid Line Isolation=2-Way control Valve Valve I.D. #42=Receiver Tank Vapor Line Isolation=2-Way Control Valve Valve I.D. #43=Receiver Tank Liquid Line Break-Away and/or Emergency release coupler Valve I.D. #44=Receiver Tank Vapor Line Break-Away and/or Emergency release coupler The present invention includes, a motion detection system, for liquefied gas fueling and/or transfer system, consisting of accelerometer(s), tri-axial accelerometer(s), inertial motion units, standing alone and/or any combination of which all may be coupled to processor(s) to computer motion, or simply a mechanical device(s) of predetermined length, which may contain a series electric circuit, alone and/or combined with any motion sensor(s) to determine if motion and/or excessive motion of fueling and/or transfer vehicle(s) has occurred. When activated, will produce and/or communicate an operational shut-down signal and/or relay, utilizing communication networks by multiple methods, may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally and/or remote.

The present invention includes a motion detection system, a three-dimensional motion detection system which contains optical, ultrasonic, magnetic sensor(s), mechanical device(s) for fueling and/or transfer system seismic motion detection; seismic motion(s) and/or detection(s) beyond predetermined set point(s). When activated will produce and/or communicate an operational shut-down signal and/or relay, utilizing communication networks by multiple methods, may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally and/or remote.

The present invention includes, a fire and or smoke detection system, utilizing magnetic and/or optical detection device(s), the device(s) may function standing alone and/or in combination with each other. When activated, will produce and/or communicate an operational shut-down signal and/or relay.

The present invention includes, an optical fire and or heat detection system, utilizing optical detection device(s), the device(s) contain ultraviolet and/or infrared detection function(s), the system combines the ultraviolet and/or infrared detector(s) to produce an output signal, of fire detection. When activated will produce and/or communicate an operational shut-down signal and/or relay.

The present invention includes, an explosion monitoring system, utilizing magnetic and/or ultrasonic and and/or infrasonic transmitters and/or receivers and/or microphone(s) and/or array(s) there-of, to detect loud, sudden, sound and/or acoustic wave(s) and or pressure wave(s). When activated, will produce and/or communicate an operational shut-down signal and/or relay.

The present invention includes, an optical Arc and/or Spark and/or Lightening detection system; utilizing optical detection device(s), when activated will produce and/or communicate an operational shut-down signal and/or relay.

The present invention includes, a fueling and/or transfer communications signal detection program, where-by multiple communication methods are utilized for multiple fueling and/or transfer data communications. Where-as three communication signals are utilized and monitored, and if any one communication signal is dropped and/or non-functioning the system continues communications with two established links; but if two or more communication links and/or signals and/or transmission methods fail, a communication failure signal is produced, this output signal and/or relay will, when activated, communicate an operational shut-down signal and/or relay. Communications must be re-established to re-set and continue fueling and/or transfer operations.

The present invention includes, an optical satellite detection and/or alignment system. This system will detect best functional satellite communication(s) system, automatically align on-board receiving and/or transmitting equipment for optimal performance; and continuously monitoring, and readjusting for optimal signal strength.

The present invention includes, a network, for communication and/or data communication(s), for all sensor(s), actuator(s), input(s), output(s), controller(s) and/or micro-controller(s), processor(s) and/or micro-processor(s), computers, systems (fire and/or heat and/or explosion and/or motion and/or lock-outs and/or seismic and/or communication(s)) utilizing communication networks by multiple methods, may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally and/or remote.

The present invention includes a network interface, which can communicate information and/or data between one or more computer system(s) and/or processor(s) by an optical connection such as by light transmitted by and/or through fiber optic cable(s), to detect omni-directional motion and/or fire and/or explosion detection and/or device(s) and/or other system and/or device(s), for the safe compressed gas and/or liquefied gas vehicle fueling and/or transfer(s) vehicle(s) and/or supplier system(s) apparatus and/or system(s), utilizing communication networks by multiple methods, may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally and/or remote.

The present invention includes a network interface, which can communicate information and/or data between one or more computer system(s) and/or processor(s) with and/or by a radio (wave(s)), to detect omni-directional motion and/or fire and/or explosion detection and/or device(s) and/or other system and/or device(s), for the safe compressed gas and/or liquefied gas vehicle fueling and/or transfer(s) vehicle(s) and/or supplier system(s) apparatus and/or system(s), utilizing communication networks by multiple methods, may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally and/or remote.

The present invention includes a network interface, which can communicate information and/or data between one or more computer system(s) and/or processor(s) with and/or by a radio wave(s); either local(ly) wave(s) and/or remotely via long distance radio wave(s) and/or satellite(s), to detect omni-directional motion and/or fire and/or explosion detection and/or device(s) and/or other system and/or device(s), for the safe compressed gas and/or liquefied gas vehicle fueling and/or transfer(s) vehicle(s) and/or supplier system(s) apparatus and/or system(s), utilizing communication networks by multiple methods, may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally and/or remote.

The present invention includes any and/or all communication(s) and/or data communication(s) and/or network(s), between processor(s) and/or programmable logic controller(s), computer(s), interface(s), network interface(s), distributed control system(s), control system(s), Master system(s) and/or Master Data Base(s), web-server(s), for communications between supplier(s) and/or receiver(s) of any compressed and/or liquefied gas fuel handling system(s) and/or apparatus, a local area network transmitting data between interface(s), by wire(d) and/or cable(s) and/or Fiber-optic cable and/or RFoF and/or wirelessly, such as by radio and/or light and/or OWC and/or any combination of wire(d) and/or coax and/or coax R.F. and/or RFoF and/or, to detect omni-directional motion and/or fire and/or explosion detection and/or device(s) and/or other system and/or device(s), for the safe compressed gas and/or liquefied gas vehicle fueling and/or transfer(s) vehicle(s) and/or supplier system(s) apparatus and/or system(s).

The present invention includes, a compressed and/or liquefied gas fueling and/or transfer system which utilizes a vapor displacement system, where-by vapor from receiving (filling) tank is removed via pressure build-up, and displaced and/or transferred to pressurize supplying tank(s) utilizing, tank(s), pipe(s), valve(s), and hose(s).

A vapor displacement system, for liquefied gas fueling and/or transfer; consisting of valves, tanks, pipes, hoses, couplers to utilize gaseous pressure build-up in a tank vapor head-space to push liquefied gas products utilizing gas and/or liquefied gas vapor pressure. (All in fluid communication via network of computers, controllers, programmable logic controllers, input and output devices.)

The present invention includes, a surge tank (which can be elevated surge tank, positioned at an elevation, greater than that of the receiving tank); for vapor separation and/or vapor pressurization and/or vapor head-space pushing of liquefied gas product out a lower (than liquid level) tank outlet and/or adapter.

The present invention includes, a plethora of control valves, which may be 2-way and/or 3-way and/or reversing valve(s), to open and/or close and/or divert flow and/or paths of vapor and/or liquefied gases with-in and/or for vapor displacement system and/or liquefied gas transfer system(s).

The present invention includes, a fueling and/or transfer system, for liquefied and/or compressed gases, that utilizes vapor head space pressure and gravity and/or gas compression for liquid push, outlet at a lower than liquid level, outlet and/or adapter of the surge tank.

The present invention includes, a fueling and/or transfer system, for liquefied and/or compressed gases, that utilizes vapor head space pressure and separation device and/or gas pressure for liquid push, outlet at a lower than liquid level, outlet and/or adapter of the surge tank.

The present invention includes, a Bi-directional Coriolis flow meter measurement system, to measure mass flow of compressed and/or liquefied gases, which consist(s) of vee-ball valve(s), temperature(s), pressure(s), and density compensated flow signal output(s).

The present invention includes, a Bi-directional sonic and/or ultrasonic flow meter (internal and/or external) for compressed and/or liquefied gases, which consists of temperature and pressure compensation for computed mass flow.

The present invention includes a motion detection system, a three-dimensional motion detection system which may contain optical, ultrasonic, magnetic sensor(s) and/or mechanical device(s) and/or sensor(s) for fueling and/or transfer vehicle motion detection; motion(s) beyond predetermined set point(s). When activated, will produce and/or communicate an operational shut-down signal and/or relay.

The present invention includes, a motion detection system, for liquefied gas fueling and/or transfer system, consisting of accelerometer(s), tri-axial accelerometer(s), inertial motion units, standing alone and/or any combination of which all may be coupled to processor(s) to computer motion, or simply a mechanical device(s) of predetermined length, which may contain a series electric circuit, alone and/or combined with any motion sensor(s) to determine if motion and/or excessive motion of fueling and/or transfer vehicle(s) has occurred. When activated, will produce and/or communicate an operational shut-down signal and/or relay, wirelessly, by radio or light.

The present invention includes, utilizing communication networks by multiple methods, may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally and/or remote.

The present invention includes, network communications, which may communicate data by wire, wirelessly (by radio or light), which may operate locally by Local area network and/or remotely such as by a wide area network and/or any combination of wire (coax and/or coax R.F) and/or RFoF and/or wirelessly by radio and/or light and/or OWC, for network communications and/or signal(s)

The present invention includes a motion detection system, a three-dimensional motion detection system which contains optical, ultrasonic, magnetic sensor(s), mechanical device(s) for fueling and/or transfer system seismic motion detection; seismic motion(s) and/or detection(s) beyond predetermined set point(s). When activated will produce and/or communicate an operational shut-down signal and/or relay, utilizing communication networks by multiple methods, may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally and/or remote.

The present invention includes, a fire and or smoke detection system, utilizing magnetic and/or optical detection device(s), the device(s) may function standing alone and/or in combination with each other. When activated, will produce and/or communicate an operational shut-down signal and/or relay.

The present invention includes, an optical fire and or heat detection system, utilizing optical detection device(s), the device(s) contain ultraviolet and/or infrared detection function(s), the system combines the ultraviolet and/or infrared detector(s) to produce an output signal, of fire detection. When activated will produce and/or communicate an operational shut-down signal and/or relay.

The present invention includes, an explosion monitoring system, utilizing magnetic and/or ultrasonic and and/or infrasonic transmitters and/or receivers and/or microphone(s) and/or array(s) there-of; to detect loud, sudden, sound and/or acoustic wave(s) and or pressure wave(s). When activated, will produce and/or communicate an operational shut-down signal and/or relay.

The present invention includes, an optical Arc and/or Spark and/or Lightening detection system; utilizing optical detection device(s), when activated will produce and/or communicate an operational shut-down signal and/or relay.

The present invention includes, a fueling and/or transfer communications signal detection program, where-by multiple communication methods are utilized for multiple fueling and/or transfer data communications. Where-as three communication signals are utilized and monitored, and if any one communication signal is dropped and/or non-functioning the system continues communications with two established links; but if two or more communication links and/or signals and/or transmission methods fail, a communication failure signal is produced, this output signal and/or relay will, when activated, communicate an operational shut-down signal and/or relay. Communications must be re-established to re-set and continue fueling and/or transfer operations.

The present invention includes, an optical satellite detection and/or alignment system. This system will detect best functional satellite communication(s) signal, automatically align and/or transfer receiving and/or transmitting equipment for optimal performance; and continuously monitoring, and readjusting for optimal signal strength.

The present invention includes, a radio satellite detection and/or alignment system. This system will detect best functional satellite communication signal, automatically transfer and/or align on-board receiving and/or transmitting equipment for optimal communication signal, and continuously monitoring, and readjusting for optimal signal strength.

The present invention includes, a radio satellite detection and/or alignment system. This system will detect best functional satellite communication signal, automatically transfer and/or align on-board receiving and/or transmitting equipment for optimal communication signal, and continuously monitoring, and readjusting and/or switching antennae for optimal signal strength.

The present invention includes, an array of satellite detection and/or alignment devices and/or antennae, this system will detect optimal functional satellite signal and automatically transfer and/or switch for optimal optical and/or radio signal strength.

The present invention includes, a radio frequency signal detection and/or an array of frequencies and/or signal(s), this system will detect optimal functional radio frequency and automatically transfer and/or switch for optimal radio signal strength.

The present invention includes, a gas and/or liquefied gas fueling transfer system, utilizing optical communications, including Fiber to the antennae and/or FTTA signal(s) and/or data and/or transmissions.

The present invention includes, a gas and/or liquefied gas fueling and/or transfer system, utilizing cellular communications including all voice and/or data and/or information communication systems.

The present invention includes, a gas and/or liquefied gas fueling and/or transfer system, utilizing a local area network (LAN), standing alone and or combined in communication with a wide area network (WAN).

The present invention includes, a gas and/or liquefied gas fueling and/or transfer system, utilizing a WAN, standing alone and/or combined with a LAN network.

The present invention includes, a gas and/or liquefied gas fueling and/or transfer system, utilizing Graphic Processing Unit (GPU) and/or Graphics processing unit processing unit (GPUPU); for data and/or information and/or artificial intelligence processing. This processor may be arrayed and/or stand alone and/or be combined with other processing units and/or PLC's and/or networked devices for system operations.

The present invention includes, a gas and/or liquefied gas fueling and/or transfer system, utilizing an Integrated Processing unit (IGPU); for data and/or information and/or artificial intelligence processing. This processor may be arrayed and/or stand alone and/or be combined with other processing units and/or PLC's and/or networked devices for system operations The present invention includes, a gas and/or liquefied gas fueling and/or transfer system, utilizing an External Processing unit (EPU); for data and/or information and/or artificial intelligence processing. This processor may be arrayed and/or stand alone and/or be combined with other processing units and/or PLC's and/or networked devices for system operations.

The present invention includes, a gas and/or liquefied gas fueling and/or transfer system, utilizing Quantum Processing unit; for data and/or information and/or artificial intelligence processing. This processor may be arrayed and/or stand alone and/or be combined with other processing units and/or PLC's and/or networked devices for system operations.

The present invention includes, a gas and/or liquefied gas fueling and/or transfer system, utilizing Artificial Intelligence and/or Machine Learning processes and/or Hy-Brid intelligence and/or Deep Learning to achieve repetitive operation(s) and/or information recall and/or Voice recognition and/or Commands and/or Image Processing and/or Image retrieval and/or Object recognition and/or Data Mining and/or Motion-Seismic processing and/or responses and/or Fire detection and/or mechanical manipulation(s) and/or motions (weather a part is-is not in proper position).

The present invention includes, a gas and/or liquefied gas fueling and/or transfer system, utilizing optical inputs and/or outputs for artificial intelligence network operations.

The present invention includes, a gas and/or liquefied gas fueling and/or transfer system, utilizing magnetic I and/or O for A.I. network operations.

The present invention includes, a gas and/or liquefied gas fueling and/or transfer system, utilizing ultrasonic I and/or O for A.I. network operations.

The present invention includes, a gas and/or liquefied gas fueling and/or transfer system, utilizing voice activated commands.

The present invention includes, a gas and/or liquefied gas fueling and/or transfer system, utilizing voice and/or word recognition system(s) and/or program(s); for system "STOP" and/or "Emergency Stop" and/or "E-STOP" and/or Controlled Stop and/or System Shut-down.

The present invention includes, a gas and/or liquefied gas fueling and/or transfer system, utilizing word recognition "FIRE".

The present invention includes, a gas and/or liquefied gas fueling and/or transfer system, utilizing word recognition "STOP".

The present invention includes, a gas and/or liquefied gas fueling and/or transfer system, utilizing word recognition "HALT".

The present invention includes, a gas and/or liquefied gas fueling and/or transfer system, utilizing word recognition "LEAK".

The present invention includes, a gas and/or liquefied gas fueling and/or transfer system, utilizing word recognition "PROBLEM".

The present invention includes, a gas and/or liquefied gas fueling and/or transfer system, utilizing word recognition "TROUBLE".

The present invention includes, a gas and/or liquefied gas fueling and/or transfer system, utilizing word recognition "Shut DOWN".

The present invention includes, a gas and/or liquefied gas fueling and/or transfer system, utilizing word recognition "SYSTEM OFF".

The present invention includes, a gas and/or liquefied gas fueling and/or transfer system, utilizing word recognition "HELP".

The present invention includes, a gas and/or liquefied gas fueling and/or transfer system, utilizing word recognition "CALL FIRE DEPARTMENT and/or 911".

The present invention includes, a gas and/or liquefied gas fueling and/or transfer system, utilizing word recognition "EMERGENCY".

The present invention includes, a gas and/or liquefied gas fueling and/or transfer system, utilizing word recognition "ISOLATE".

The present invention includes, a gas and/or liquefied gas fueling and/or transfer system, utilizing word recognition "CLOSE VALVES".

The present invention includes, a gas and/or liquefied gas fueling and/or transfer system, utilizing word recognition "RELEASE hoses and/or vehicle".

The present invention includes, a gas and/or liquefied gas fueling and/or transfer system, utilizing word recognition program, utilizing all listed words standing alone and/or in any combination to alert system to STOP and/or Shut-down.

The present invention includes, a gas and/or liquefied gas fueling and/or transfer system, utilizing word recognition program(s) of all global languages and/or translations and/or interpretations of words for proper understanding and output action(s).

The present invention includes, a gas and/or liquefied gas fueling and/or transfer system, utilizing gesture recognition system(s) and/or program(s).

The present invention includes, a gas and/or liquefied gas fueling and/or transfer system, utilizing an oxygen detection system, the system may include optical, magnetic, ultrasonic, or chemical detection devices. This system may monitor oxygen content with-in the tank(s) and/or transfer and/or fueling system(s) to alert of excess oxygen content presence. Different levels and/or readings will have multiple output and/or relays and/or actions for proper system control.

The present invention includes, a gas and/or liquefied gas fueling and/or transfer system, utilizing a tank vacuum insulation monitoring system, this system will utilize compound pressure monitoring devices, and will alert at different vacuum pressure levels for manual and/or automatic system operation and/or control.

The present invention includes, a network, for communication and/or data communication(s), for all sensor(s), actuator(s), input(s), output(s), controller(s) and/or microcontroller(s), processor(s) and/or micro-processor(s), computers, systems (fire and/or heat and/or explosion and/or motion and/or lock-outs and/or seismic and/or communication(s)) utilizing communication networks by multiple methods, may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally and/or remote.

The present invention includes a network interface, which can communicate information and/or data between one or more computer system(s) and/or processor(s) by an optical connection such as by light transmitted by and/or through fiber optic cable(s), to detect omni-directional motion and/or fire and/or explosion detection and/or device(s) and/or other system and/or device(s), for the safe compressed gas and/or liquefied gas vehicle fueling and/or transfer(s) vehicle(s) and/or supplier system(s) apparatus and/or system(s), utilizing communication networks by multiple methods, may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally and/or remote.

The present invention includes a network interface, which can communicate information and/or data between one or more computer system(s) and/or processor(s) with and/or by a radio (wave(s)), to detect omni-directional motion and/or fire and/or explosion detection and/or device(s) and/or other system and/or device(s), for the safe compressed gas and/or liquefied gas vehicle fueling and/or transfer(s) vehicle(s) and/or supplier system(s) apparatus and/or system(s), utilizing communication networks by multiple methods, may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally and/or remote.

The present invention includes a network interface, which can communicate information and/or data between one or more computer system(s) and/or processor(s) with and/or by a radio wave(s); either local(ly) wave(s) and/or remotely via long distance radio wave(s) and/or satellite(s), to detect omni-directional motion and/or fire and/or explosion detection and/or device(s) and/or other system and/or device(s), for the safe compressed gas and/or liquefied gas vehicle fueling and/or transfer(s) vehicle(s) and/or supplier system(s) apparatus and/or system(s), utilizing communication networks by multiple methods, may communicate signal(s) by wire and/or wirelessly by radio and/or light and/or and/or any combination of wire (coax and/or coax R.F) and/or RFoF and/or wirelessly by radio and/or light and/or OWC, for network communications and/or signal(s) with central detection system and/or microcontroller and/or processor and/or locally and/or remote.

The present invention includes any and/or all communication(s) and/or data communication(s) and/or network(s), between processor(s) and/or programmable logic controller(s), computer(s), interface(s), network interface(s), distributed control system(s), control system(s), Master system(s) and/or Master Data Base(s), web-server(s), for communications between supplier(s) and/or receiver(s) of any compressed and/or liquefied gas fuel handling system(s) and/or apparatus, a local area network transmitting data between interface(s), by wire(d) and/or cable(s) and/or Fiber-optic cable and/or RFoF and/or wirelessly, such as by radio and/or light and/or OWC and/or any combination of wire(d) and/or coax and/or coax R.F. and/or RFoF and/or, to detect omni-directional motion and/or fire and/or explosion detection and/or device(s) and/or other system and/or device(s), for the safe compressed gas and/or liquefied gas vehicle fueling and/or transfer(s) vehicle(s) and/or supplier system(s) apparatus and/or system(s).

Communications

Quantum computers and Quantum communications provide security and speed, both of which are necessary in our evolving data connected world. Artificial Intelligence, Synthetic Intelligence, machine learning, and voice activated commands all require large volumes of data recall, data processing, and algorithms to compute in real time, to produce tangible results, granted one of the main differences between today's binary computers and Quantum computing is the speed at which the Quantum Computer is capable of processing. Today's computers have difficulties processing at required speeds. Quantum computing is basically linear algebraic. The speed, is will increase machine learning and artificial intelligence programs to be able to operate in real time. Quantum Teleportation and/or Quantum data communications, Quantum Internet, sometimes referred to as QCOMM, or quantum internet, or quantum entangled qubits; via Qubit (has several names qbit, qubit, quantum bit) and/or Optical Qubit (Fiber Optic F.O.), and Photon Based Qubit (open and/or free space networks), Qubyte (equals eight Qubits), and qutrit (equals trit=ternary (computer). Quantum teleportation is a system for transferring quantum information from sender to receiver. Quantum teleportation and/or Quantum data communications are with-in the scope of this invention.

Open destination teleportation uses wave packets of light for transfers, may also use a Hybrid technique (both F.O. and Open space optical). This process involves transferring the information between carriers and not the movement of the actual carriers. Main components for teleportation include a sender, a qubit, a traditional channel, a quantum channel, and a receiver. For actual teleportation, it is also required that an entangled quantum or Ball state be created for the qubit to be transferred, both entangled particles will act as one quantum state. The sender will the prepare the information (particle) in the qubit and combine one of the entangled particles, causing a change of the entangled state, the change of state will be measured for change, this measurement will allow the receiver to reconstruct the original quibit, and receive the teleported information. The quantum channel is the communication method used for quantum information transmission, the traditional channel must also be used to accompany a qubit to preserve the quantum information. The measurement information is carried via the traditional channel, so quantum information can be re-constructed. Proper protocol is necessary for qubit teleportation. Qubits must be individually addressable, and physically labeled. Quantum entanglement is well suited for data that requires privacy, or synchronization. Such as quantum key distribution (QKD), clocks in sync, telescopes, position verification, two party cryptography. A quantum internet also enables secure access to a quantum computer in the cloud. Quantum networks allow for information to be created, stored, transmitted achieving a level of privacy, security, and computational clout that is impossible with today's internet. Further more qubits can be encoded in a variety of methods, including the polarization of photons or the spin states of electrons.

Quantum internet will require the use of repeaters at determined distances, trusted repeaters will reduce decoherance, and allow entanglement with out error to qubit. Fiber optic networks can be single mode or multimode. An avalanche photodetector for polarization via beam splitter or interferometer reduces decoherence incidents, thus reducing loss errors and or operational errors.

Qubits and quantum networks may also be considered for distributed quantum computing, multiple quantum processors linked thru a quantum network, sending qubits between them, thus A Quantum Computer Cluster. A set of quantum computers working together as a single unit. Some systems allow removal of node, fenced, while remainder of system remains operational. Other clusters may have multiple interfaces, such as one for internet and/or general purpose network and the other interface is for local cluster network communications.

Optical switches capable of delivery of qubits, quantum optical router is another name for optical switch. Optical modulators and optical routers can be made from each other Optical switches may be operated by electro-optic effects, magneto-optic effects or other methods may also be used to perform logic operations, plus semiconductor optical amplifiers, which are opto-electronic devices that may be used in place of optical switches and be integrated with microelectronic circuits. They are used for rerouting of optical switch transmission path, such as during a system fault, rerouting around the fault.

Connections established may be bi-directional or one way. An all optical switch, is when an optical signal is used to switch an optical path for another optical signal. Optical protection, test systems, add drop multiplexers, Remote Fiber Test Systems (RFTS) and sensing. Which can monitor and locate a fault on a fiber transmission line. Plus optical cross-connects using switching optical fabrics to interconnect multiple optical inputs and outputs.

Quantum security, via Quantum message authentication, Quantum Digital signature, Quantum one-way functions, quantum finger-print(s), Position based quantum cryptography, Quantum key distribution, BB84 quantum cryptograph protocol, and self destruction of qubit after properly communicated.

Quantum communications will be extremely valuable for compressed and/or liquefied gas transfers and or fueling systems, be it for land based vehicle, marine, aircraft, or spacecraft. The security, and Artificial Intelligence capabilities will allow automatic fueling and transfer systems to function safety. The following diagrams depict scenarios which will be beneficial for communications, automation, and reduced accidents with proper protocols during fueling and or transfer operations.

In FIG. #7, network communications are taking place simultaneously, thus redundancy equals safety. FIG. #7: Item #1 is displaying the orbiting communication satellites, which may be standard or quantum communication satellites. These satellites communicate via multiple methods and multiple routes, with multiple locations. They communicate wirelessly, via optical and/or Radio; with satellites, vehicles, fueling and/or transfer systems and/or apparatus, and data centers, the later may also cross connect with cellular networks. The satellites may communicate directly with cargo ships, trucks, spacecraft, providing vital data for increased efficiency, and fuel economy.

In FIG. #7: item #2 is displaying the land based data center, called the NOC, or network operation center. The NOC is the center of all communications, the "beating Heart" of the data Communications Network. This center communicates via multiple systems, protocols, networks, such as quantum network(s), or binary network(s). The data center communicates via wired, or wirelessly by radio and/or light. The data center utilizes optical transmissions via Optical wireless communication, short, medium, and long range. It also has fiber optic cables for optical transmissions. It may use fiber to the antennae (FTTA), fiber to radio switching, fiber optic switching. The hub of information is processed by GPUPU's or GPU's or EGPU's, or quantum computers, much information and/or data is input and output, processed, routed, transferred, including positioning, weights, loads, spoilage dates, speed, dock ETA, fuel requirements, manpower and offloading equipment, weather, camera's, security, online functionality, power monitoring, UPS monitoring, UPS testing, Back-up Power systems. All for safe reliable communications. The NOC has several antennae on or near, for wireless communications via radio and/or light. The signals communicate with all parties via direct wireless signal, via sat-com, via fiber optic cables, or wired connections.

In FIG. #7, item #3, is displaying a compressed and/or liquefied gas transfer and/or fueling system and/or apparatus, with multiple communication methods. It is shown to have wired, wireless by radio and/or light; this will communicate with the data center, the vehicles, the satellites, and cellular networks. The system has multiple redundant safety features covered in U.S. Pat. No. 10,500,954, and it's own data communication network with-in, which may be quantum GPUPU's. The system may be set up to fill cargo's or receive cargo's of compressed and/or liquefied gas's, plus filling of other vehicle's such as railroad locomotive's, truck's, or even near-by power plant feed.

In FIG. #7, item #4, is displaying a vehicle, which may load or unload via fueling and/or transfer system for compressed and/or liquefied gas. This vehicle, will communicated via wired or wirelessly by radio and/or light, to the fueling apparatus to transfer data and ensure safeties are properly being used, if not system will cease to function until correction is made. Many safeties are involved to protect humans and assets, and systems ensure the devices are utilized correctly.

In FIG. #7; Item #5, is displaying a cargo ship, possibly transporting compressed and/or liquefied cargo into or out of port. The cargo ship has it's own network on-board, for transfer safety systems, plus communications with other networks such as wired, wirelessly by radio and/or light to satellites, compressed and/or liquefied gas transfer and/or fueling system, and data center(s) direct and/or via satellite. The communication networks are reliable for navigation, GPS, Positioning, ETA, speed, fuel consumption, directions, all for more efficient operations. Multiple redundant network options keep ships at sea safe, by providing weather and oceanic, tidal, wave conditions updated.

In FIG. #18; Item #1, is displaying the orbiting communication satellites, which may be standard or quantum communication satellites. These satellites communicate via multiple methods and multiple routes, with multiple locations. They communicate wirelessly, via optical and/or Radio; with satellites, vehicles, fueling and/or transfer systems and/or Artificial Intelligence automatic fueling apparatus, and data centers, the later may also cross connect with cellular networks. The satellites may communicate directly with vehicles such as Spaceships, ships, trucks, spacecraft, providing vital data for increased efficiency, docking, fueling, and data communications.

In FIG. #8; Item #2, is displaying a spacecraft's fuel tank, which happens to be an oxygen tank (NASA refers to oxygen as fuel), the spacecraft will perform a docking maneuver utilizing state of the art sensor's, so that it may transfer fuel load from one craft to another for further mission needs. Data communications between spacecraft and satellite may be wireless, by radio and/or light, the processors may be quantum processors with quantum communication(s). The data communications is critical, redundancy is required to ensure safe positioning, docking, coupling, and transfers occur.

In FIG. #8; Item #3, is displaying a spacecraft's fuel tank, which happens to be a liquefied natural gas tank, the spacecraft will perform a docking maneuver utilizing state of the art sensor's, so that it may transfer fuel load from one craft to another for further mission needs. Data communications between spacecraft and satellite may be wireless, by radio and/or light, the processors may be quantum processors with quantum communication(s). The data communications is critical, redundancy is required to ensure safe positioning, docking, coupling, and transfers occur.

In FIG. #8: item #4 is displaying the land based data center, called the NOC, or network operation center. The NOC is the center of all communications, the "beating Heart" of the data Communications Network. This center communicates via multiple systems, protocols, networks, such as quantum network(s), or binary network(s). The data center communicates via wired, or wirelessly by radio and/or light. The data center utilizes optical transmissions via Optical wireless communication, short, medium, and long range. It also has fiber optic cables for optical transmissions. It may use fiber to the antennae (FTTA), fiber to radio switching, fiber optic switching. The hub of information is processed by GPUPU's or GPU's or EGPU's, or quantum computers, much information and/or data is input and output, processed, routed, transferred, including positioning, weights, loads, spoilage dates, speed, dock ETA, fuel requirements, manpower and offloading equipment, weather, camera's, security, online functionality, power monitoring, UPS monitoring, UPS testing, Back-up Power systems. All for safe reliable communications. The NOC has several antennae on or near, for wireless communications via radio and/or light. The signals communicate with all parties via direct wireless signal, via sat-com, via fiber optic cables, or wired connections.

In FIG. #8: Item #5 is displaying different antennae at the NOC. An omni-directional radio frequency antenna beams RF up to orbiting satellite and spacecraft, and receives RF back from both. Also a Satellite dish type antennae is also sending and receiving RF signals for Satcom and spacecraft data from the satellites in orbit, therefore constantly moving, an automatic positioning system to maintain optimum signal strength is included, therefore maintaining reliable signal between earth and spacecraft plus satellite.

In FIG. #8; Item #6, is displaying an optical antennae, for OWC. This is located at the NOC, and optically communicates with satellite and/or or spacecraft. Data is transmitted via optical signals, bi-directionally, and communications are redundant and robust. Data is broad range of scientific, weather, fuel, mapping, orbiting status. All data can be sent and/or re-routed via land networks by wired, wirelessly by radio and/or light, or cellular networks.

There are many different methods of land based routes for data to be transferred between NOC's, and interoperability of NOC's and/or Data centers. Shown are wired, wirelessly by radio and/or light. Cellular, Fiber Optic cable, Optical Wireless Communication, repeaters, all combine to provide robust redundant data communications from NOC to NOC, from NOC to Satellite, from NOC to Spacecraft.

Reliable communications, with several back-up options is crucial for many different vehicles, including all spacecraft, all marine, all railroad, trucking, and passenger vehicles. Today, we rely on recent data which includes maps, mapping, weather, locations, and law enforcement tracking. These computer driven systems, with state of the art communications systems provide all with necessary data, that should never again be lost.

Refueling in Zero Gravity

Fueling spacecraft in space, with-out gravity may present a challenge. Realization of the effects of weightless inside fuel tanks, questions if the fuel and/or oxidizer of less than full tank, say 20% remainder, make its' way to the tank outlet? Or does it free float through-out the tank?

In an attempt to overcome zero gravity, vapor displacement with a sliding metal disc, will alleviate the problem. It will add some weight to spacecraft, but if zero gravity fueling is in its future, the added weight will be required.

The sliding metal disc shall be slightly less in diameter than inside of fuel tank. (NASA refers to oxygen as fuel) so both liquefied Natural gas and liquefied oxygen tanks shall be included. The plate and/or disc shall have an outer layer, grooved for duel o-rings, to isolate vapor side from liquid side. This vapor displacement will shift metal disc back and forth, as fuel is consumed, and fueling is being taken on.

A gas cylinder which expands, or pushes outward as charged, and retracts as discharged may also be used. This simple expansion and contraction may help guide the disc, and also push and/or squeeze liquid together, such as a tube of toothpaste, to get last 20-30-percent of fuel out of tank outlet.

Figures 9, 10:
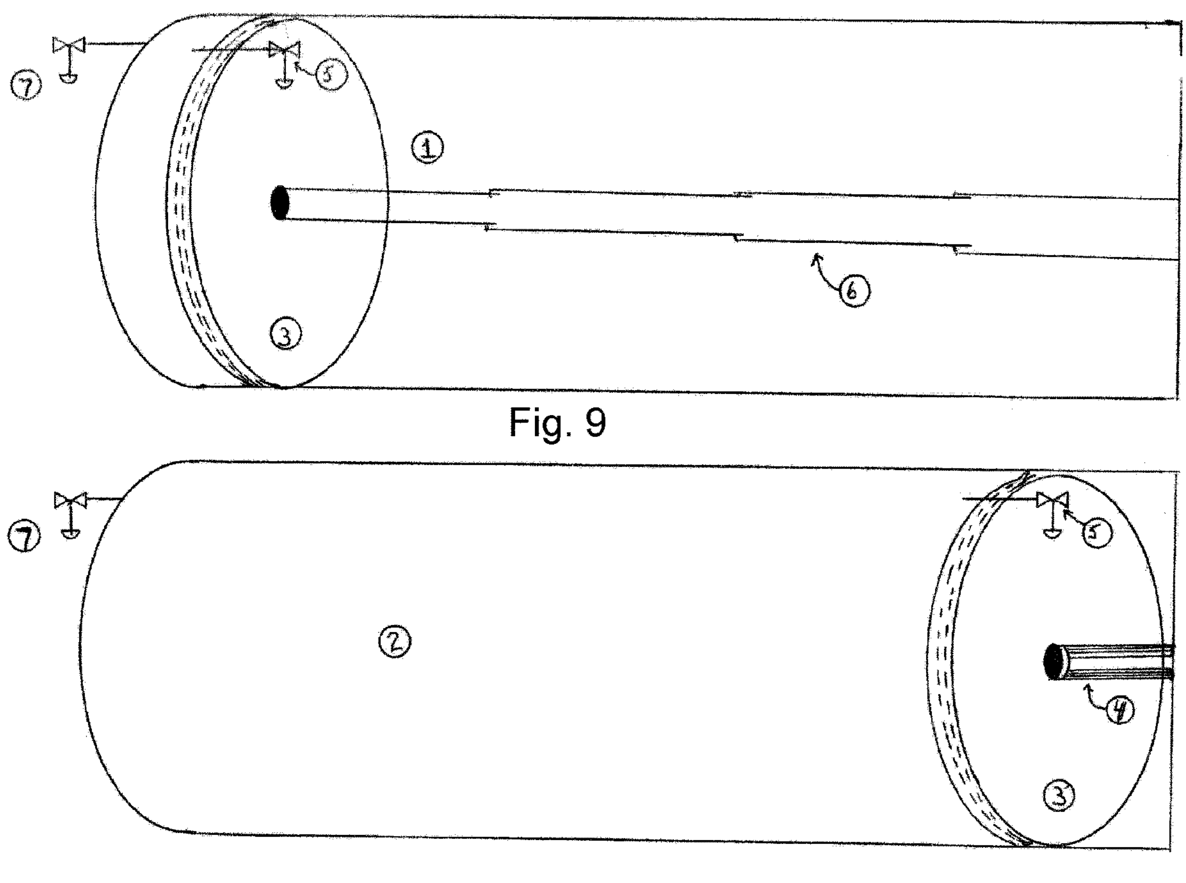
FIGS. 9-10 show refueling in zero gravity.
Figure 11:
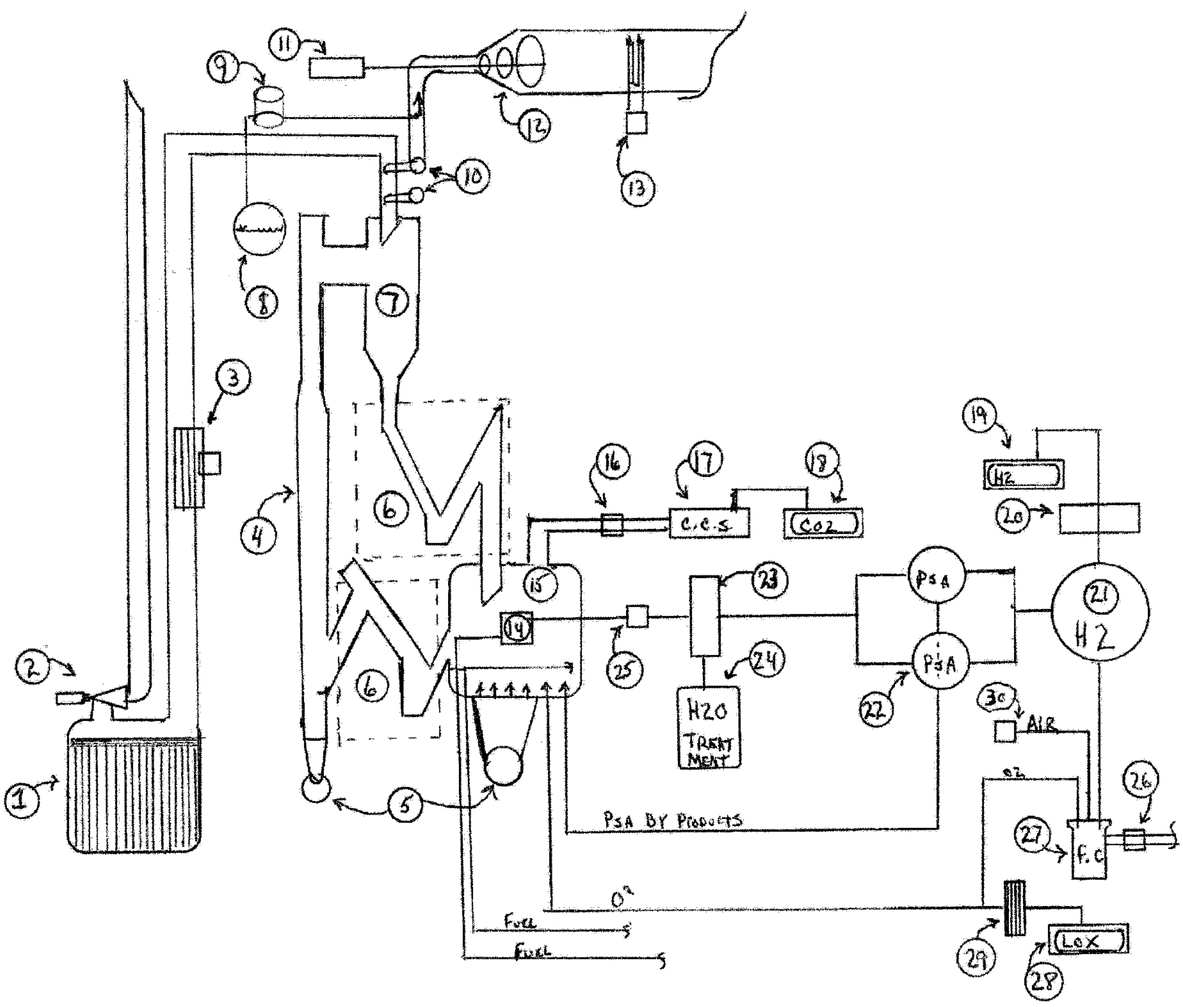
FIG. 11 shows a schematic of an Onboard Internally Recirculating Chemical Looping Combustion system (IRCLCS).

On FIGS. 9-10, Item #1, depicts the vapor side of disc with gas cylinder extended fully.

Item #2, depicts the liquefied side of disc, with gas cylinder fully retracted.

Item #3, is shown the disc, the dotted lines on the circumference show the duel O-Rings.

Item #4, is shown the collapsed cylinder.

Item #5, is shown an equalizer and/or bleed off valve.

Item #6, is shown the cylinder fully extended.

Item #7, is shown tank outlet, with control valve.

So, the cylinder may also use hydraulics, pneumatics, electric screw, plus use more than one cylinder. The disc may add weight, and may not empty tank 100% percent, like wise usable tank space may loose up to 10% for disc and cylinders or scissor system collapsed. Force and/or squeezing the liquid closer to tank outlet, with-out building excessive pressure is the goal, to emptying and filling liquefied gas tanks in a zero gravity environment.

Onboard Internally Recirculating Chemical Looping Combustion System

In the global movement to clean and De-Carbonize vehicle emissions, evolving technologies are improving and merging to achieve zero and/or near zero emissions. The systems and processes are more complex, but necessary to meet requirements for cleaner vehicle emissions.

There are also multiple different systems and/or paths for fuel consumption. The combustion engine has been vastly improved to increase efficiency and reduce emissions, now achieving near zero emissions. The vehicle emission reductions, when quantified, are substantial, and clean fuels are a key component of the reductions. There are also turbines/micro-turbines, rotary engines, and various types of fuel cells. Fuel cell efficiency as well as internal combustion, may also be improved with increased oxygen % percentage (s) of system intake. Oxygen/Natural Gas/Butane/Hydrogen/Propane/ethane/ammonia (NGHPETA/O) may be separated, and or produced onboard or it may be supplied as a compressed/liquefied gas; also, any onboard reformer/gas cleaving cleaving/separation process onboard is also with-in the scope of this invention; such as stripping H2 out from CH-4, by high temp./steam cracking/reformer on the vehicle, for use as fuel/fuel-compound/oxidizer This system, Onboard Internally Recirculating Chemical Looping Combustion System(s) (IRCLCS), has a different path and method for fuel consumption. The IRCLCS has several distinct features which will change the worlds' shipping and power industries for the better, and supply power to onshore power grids and near shore facilities with clean, decarbonized energy.

The IRCLCS system, which will produce clean energy, from multiple, yet, interconnected sources, with highly efficient processes, which will yield greater power output, consuming less fuel, and with near zero emissions. The use of steam methane reformer(s) (SMR), of which their may be multiple, auxiliary units, for additional Hydrogen production during longer port calls. SMR's coupled with a water-gas shift reformer, will yield higher quantities of Hydrogen. Plus, use of palladium alloy with silver in the pressure swing absorption system yields higher quality hydrogen, and the by-products (tail gas) will be recycled back into the fuel reformer and consumed, thus yielding a greater CO2 quality and yield for capture, and liquefied for storage. The carbon dioxide may also be later sold to cement manufactures for use in new production process. The Hydrogen produced will contribute to over all system fuel efficacy. Plus innovative waste heat recovery exchangers, coupled to smaller generators will also increase over-all system efficiencies; all for a low carbon energy solution.

The IRCLCS process makes use of oxygen carriers, such as metal oxides, which are circulated and/or recirculate, by pneumatic transfer and gravity. The metal oxides are oxidized in the oxidizer reformer, which oxidizes and transfers via (Bed) Air Blower (AB) up to a cyclone vessel, and then dropped via gravity due to decrease of flow rate; of feet per second (FPS), drop-off due to greater volume of cyclone. The angled cyclone, greater than the angle of repose, will ensure metal oxides fall into the "KAT SEAL", via gravity. A flue outlet at top of cyclone will capture system heat and transfer to the optional pre and post super heater headers, the flue gas may be drawn downward via an induced draft fan with variable speed control, this inverted heat trap is designed for system heat capture, may also contain an optional aqueous ammonia injection system for NOX reduction, along with an automatic self cleaning, (bag) filtering system.

The Kat seal is also part of the process, it physically separates major parts of the system, yet it connects them. The Kat seal utilizes a "trap" style configuration, with an auger and/or bucket lift system, where-by, the seal is created by a "Build-up" of the metal oxide bed materials, but the auger and/or bucket lift, plus gravity keeps progressing bed material from the cyclone into the combustion reformer, thus continuously feeding the combustion reformer with re-oxidized metal oxide bed material for consumption. Therefore the Kat-Seal separates the Oxidizer Reformer and/or the cyclone from the Combustion Reformer, but it also connects them.

The Fuel reformer, which has several feeds, and exit, is also a feature of this invention. The Fuel reformer and/or the combustion reformer, uniquely consumes the fuel via oxidization; not the direct fuel to air combustion, as in a standard Internal Combustion Engine. It is combustion via oxidization, not controlled detonation. It is also referred to as closed loop combustion with oxygen un-coupling. This fuel consumption also occurs upon and/or with-in a fluidized bed, via the Combustion Bed Blower, mixing the fuel(s) and the oxidizer together for the chemical reaction; fuel(s) and oxidizer(s).

The combustion reformer may have several feeds; oxidized fluidized bed media, and/or metal oxide feed from the cyclone Kat seal. Fuel, which may be natural gas, propane, butane, ethane, hydrogen, syn-gas, Bio-methane, plus and gas mixture and/or combination, ammonia, plus many different solid, liquid, or vapor fuels. Another feed is the "By-Products gas" feed, this is recycled tail gas from the Pressure swing absorbers, which separates out Hydrogen gas; which is an exit stream from the Steam methane reformer, which may reside with-in (combined) the fuel and or combustion reformer, or stand alone, and saturated purified steam is then introduced into flow path, which, increase hydrogen yield. This Purified Hydrogen stream may then be stored as compressed and/or liquefied gas and/or fed to a fuel cell and/or any engine onboard, or it may be "Spiked" into natural gas engine feed system for addition clean energy efficiency.

The combustion reformer may also have an oxygen feed, this stream will supply gaseous oxygen for improved fuel reaction and/or fuel consumption and/or combustion. All of the fuel feeds to the combustion and/or fuel reformer will be controlled via N.C. control valves with positive position feed back, and fuel, oxygen, tail gas will be fed thru a double block and bleed plus metering arrangement for safety.

The onboard fuel cell(s), which are fed with the separated hydrogen, which is cleaved and/or processed by onboard steam methane reformer(s), and PSA's, may also improve efficacy utilizing oxygen into it's intake feed system. This oxygen may be produced onboard, such as by oxygen concentrator and/or ozone generation, and/or supplied as a gas and/or liquefied gas LOX from onboard storage. Oxygen as an oxidizer can have several different chemical make-up's, such as pure oxygen, liquefied oxygen, O2, O3 (oxygen triplet), ozone, O4 tetraoxo and/or tetraozone, all are oxidizer(s) agents, all may be liquefied, all may be produced onboard and or supplied as gas and/or liquefied gas for these innovative processes and system(s). The Oxyhydrogen will improve fuel cell performance, and excess thermal may also generate improved performance via Rankin cycle loop. The compressed/liquefied gas oxygen may be supplied in sea-container like exchangeable tanks/fix onboard vessels.

Another feature of the Fuel Reformer and/or combustion reformer is that since the combustion process oxidizes the fuel, rather than controlled detonation of fuel, the emission(s) volume is reduced. The fuel reformer emissions contain mainly carbon dioxide (CO2) and water vapor (H2O), which are further separated, then CO2 is compressed and liquefied for onboard storage, such as a Type "C" sea-container for safe removal and/or swap-out during re-fueling. The exchangeable tank(s) and/or sea container(s) may be set upon load cells for measurement of CO2 quantity. The IRCLCS reduces the need for an air separation unit, saving Capex dollars, valuable space, plus OPEX costs.

The fuel reformer and/or combustion reformer bed material is continuously moving and/or transferred, via another "KAT SEAL", this Kat seal separates and/or connects the fuel and/or combustion reformer to the air and/or oxidizer reformer. The systems' "Kat Seal(s)" keep the reformers separated, but connected, via continuously transferring oxidizing bed media material.

The Kat seals are also part of this process, they physically separate major parts of the system, yet they connect them. The Kat seal utilizes a "trap" style configuration, with an auger/screw and/or bucket system, which may be single or double axle drive, and may be electric, hydraulic, driven, with/with-out gear drive, plus variable speed and reverse for catalyst level control. The seal is created by a "Build-up" of the metal oxide bed materials, but the auger screw and/or bucket lift, plus gravity keeps progressing bed material from the combustion and/or fuel reformer into the air and/or oxidizer reformer, thus continuously feeding the air and/or oxidizer reformer with spent metal oxide bed material for RE-oxidization process. Therefore the Kat-Seal separates the Combustion and/or fuel Reformer from the air and/or oxidizer Reformer, but it also connects them.

This continuous LOOPING of the oxidizing reagent give way to it's name. "Onboard Internally Recirculating Chemical Looping Combustion System". The Kat Seal system may have optional air nozzles, to aid with stubborn transfer.

The system has several critical design and control system features for proper continuous operation. The size, pressure, and shape of the oxidizer, and Bed blower volume and pressure must be such that the feet per second flow is proper for metal oxide carry over (pneumatic flow) and cyclone sizing for material drop out. The cyclone to fuel reformer loop seal; size, shape design, pressure, and bed blower volume be such that proper fluidized material transfer is maintained with proper a seal. The fuel and/or combustion reformer design, which may (or may not) contain steam methane reformer with-in, is properly sized, located (above oxidizer reformer bed, for gravity feed via loop seal), with proper fuel bed blower volume, pressure, flow distribution, with bottom fuel, tail gas, and oxygen feed systems, via Normally Closed control valves. Plus a fuel/combustion reformer to oxidizer reformer "Kat SEAL", which will act as a seal, but also transfers continuously feeding of metal oxide for regeneration, via loop seal bubbling bed blower and gravity.

The system will generate thermal energy, which may be converted to High pressure steam, and cycled thru a steam turbine for generation of electric power and/or shaft output power, and/or to auxiliary steam methane reformer(s), for additional Hydrogen production (such as while ship is at idle in port).

This invention also includes battery electric storage units. These optional battery storage units may utilize sea container(s) and/or sized like sea containers for ease of handling, but the system may store excess electrical energy, such as during a port call, when vehicle is at rest, and use later when demand is needed. The continuously operated chemical looping system is designed for continuous operation, therefore sizing of system(s) and/or Hybrid battery system should be considered, as functionally operational system requires. (ie, short hauls vs. long journeys). The best option is to have sufficient battery power to operate entire IRCLCS for operations to trouble-shoot power interruption, therefore keeping internally recirculating chemical looping combustion system continuously functioning, avoiding shut downs and re-starts, which are rather lengthy endeavors, by properly sized battery electric back-up system will enable continuously operations of the IRCLCS system, very advantageous.

The reformers may have water jacket(s)/walls and optional wing walls for steam generation. The system may also utilize optional pre-super heater and post super heaters with attemporation system to condition steam for steam turbine (lowering steam output temp. while maintaining steam pressure), via a distilled water condenser, steam from header condensed out with feed water from boiler feed water system (pump & conditioning), thus elevating boiler feed-water temperature. The feed-water riser may be inside down-corner for additional economizer energy recovery.

Other, additional benefits of this system, can be the utilization of scavenger heat. This system has multiple outlets for heat recovery. First, between steam turbine and condenser, a heat recovery exchanger can capture more thermal energy for utilization. Second, in the flue gas downcomer, a heat exchanger can capture thermal energy. Third, in the SMR output line to the PSA, a heat exchanger may recover thermal energy. Fourth, in the CO2/H20 exhaust line, an exchanger may capture thermal energy. And fifth, the heat generated by the fuel cell(s) can be recovered, and utilized in a Rankine Cycle. All five points of thermal capture may utilize a local Rankine Cycle Turbo-expander system with electrical generation benefit; the optional Rankine cycle system(s) will add up to enhanced system efficiencies and/or fuel economy, all while producing no emissions profile, efficient use of waste heat for extra power production.

This unique IRCLCS, is scalable, which means is can be sized for ship power, locomotive power, ship to ship power (such as power for another vehicle (ship) during port stay), or mechanized barge vehicle, to provide self power but also for merchant power to remote islands, villages, or even feeding a decommissioned power plant via existing transmission and distribution grid infrastructure. As stated, "continuously" this system is designed for continuous operation, stopping and starting is not recommended, therefore long term operational design is optimum. Plus Ports and Harbors will appreciate surrogate ultra clean power supply with near zero and/or zero emissions during port calls.

This invention also includes multiple onboard power system matchings, such as an IRCLCS along with one or more internal combustion engine(s), possibly utilizing the same fuel, but completely isolated by fire proof and/or explosion proof safeing walls. The match engine(s) will mainly act as stand-by, which also may be coupled to it's own separate electrical generator and/or direct drive and/or both. This redundant safety feature of an addition power system(s) ensures reliability in case one system may have a failure.

The IRCLCS system may have a "Bag-Style" cleaning system, which captures particulate matter with-in the exhaust stream. This system will contain alternating "Bag-House" units, so that one is always "On-Line" while the other is in clean mode. The program will automatically alternate, but a High Differential Pressure system may override and increase cleaning cycle if differential pressure system indicates dirty filter exist. The system will remove particulate matter from exhaust stream and properly dispose of, for further dumpster handling. This exhaust cleaning process will ensure no noticeable PM escapes via the exhaust outlet.

System(s), component(s), control(s), for IRCLCS system functionality.

Oxidizer Reformer, Cyclone, Fuel and/or Combustion reformer, cyclone to fuel reformer Kat seal, fuel reformer to oxidizer reformer Kat seal, Air bed blower for oxidizer, air bed blower for fuel reformer, bed air blowers for two loop seals, Induced draft fan, bag house, hydraulic pressure unit, lube oil unit, Battery electric storage unit, Steam Methane reformer(s), saturated pure water steam injection system, water purification system (carbon filtering, de-mineralizing, de-ionizing, reverse osmosis system, ultra-violet light filtering, for zero.zero microsiemen water) water walls, wing walls, steam drum, distilled water condenser, boiler feed water pump & controls, differential pressure (D/P) and/or IRCLCS flow and or temperature measurement and/or transmitter (xmtr) across oxidized bed, across oxidizer, across oxidizer to cyclone, from cyclone to flue gas downcomer, across cyclone, across Kat seal from cyclone to fuel reformer, across fuel reformer, across fuel reformer bed, across smr, across fuel reformer to gas outlet to PSA, across PSA, across Kat seal from fuel reformer to oxidizer, Optical, magnetic, ultrasonic measurements of air, gas(s), fuel(s), oxygen, steam, boiler feed water, flue gas, emission(s), tail gas(s), for temperature, pressure, level, flow, opacity, spectrometer analyzer(s), atmospheric monitoring including L.E.L./U.E.L./emission levels/oxygen level(s), oxygen detection with-in fuel reformer system. The system contains many different flow paths/tank(s)/piping/valve arrangements, therefore a plethora of temperature/pressure/level/flow measurement devices used to sense, and/or control the liquefied gas fueling/transfer(s) and/or vapor displacement and/or transfer(s) are with-in the scope of this invention. Plethora of the sensor(s) and/or outputs may have xmtrs that communicate with system(s)/may communicate signal(s) by wire/wirelessly by radio/light/and/or any combination of wire (coax/coax R.F)/RFoF/wirelessly by radio/light/OWC, for network communications and/or signal(s) with central detection system/microcontroller/processor/locally or remote, also fuel level, storage systems, delivery systems. Following list of control valves shall contain positive position feed back signal for Fuel, Oxygen, Tail gas, Air, ammonia, Flue gas, exhaust gas, CO2, H2, gas/liquid/storage, bed ash outlet rotary valve, reformer inlet valves, inlet guide vanes, damper(s), bed ash outlet conveyor, catalyst and/or oxidizer feed conveyor which may be pressurized, optional lime feed conveyor, Steam system, Boiler feed water system, Sweetwater condenser, attemperator system, Pressure Swing Absorbers, Oxygen concentrator(s), CO2/H2/Oxygen drier(s), compressor(s), pump(s), blower(s), conveyor(s), refrigeration system(s) for liquefaction (H2/LOX/CO2); valving, flow metering and/or measuring and/or block and bleed valving system(s), Kat Seal isolation system, Vibration monitoring for rotating machinery, magnetic levitation bearings, bearing temperature sensor(s), Variable speed controllers for all blowers and or fans, steam turbine, condenser, Auxiliary Steam methane reformer(s), rankine cycle systems and/or heat recovery units, Programmable logic controllers (PLC), Distributed control system(s)) DCS), bag filter unit(s), bed material feeder system(s), generator system(s), synchronizer(s), over-speed trip, multi-phase, single phase, three phase, nine pole, twenty seven pole, alternating current (A.C.), Direct Current (D.C.), Inverter(s), Power Inverter(s), switchgear, diode(s), power feed monitoring system(s), Tie Breaker(s), MVARs, Ampere(s), voltage, frequency, hertz, temperature(s), power supplies, battery storage and/or back up system(s), U.P.S. system(s), power conditioning systems, transformer(s), buss duct, cable(s), conductor(s), motor overloads (MOL), motor control center(s) (MCC), fuse(s), breakers, circuit breakers, relays, transfer switches, automatic transfer switches, switches, coils, rectifiers, variable speed drives (VFD), contactors, auxiliary contactors, indicators, disconnects, start/stop buttons, emergency stop device(s), starter(s), power distribution centers, computer(s), processor(s), processor(s) with memory, peripheral devices such as printer(s), monitors, keyboards, mouse, optical reader(s), memory cards, Graphics processing unit (GPU), GPUPU, video monitoring system(s), Infrared video monitoring, camera(s), high speed camera(s), digital camera(s), remote monitoring and/or wireless communication systems by radio and/or light, antennae, self adjusting antennae(s), an array of antennae(s).

Review of Depictions; FIG. #11

On FIG. #11, Item #1, is the Draft Bag Cleaning System, it shall remove any particulate matter which may escape from the system, and filter it out. This system shall consist of two sides, and/or flow diversion path, so that one side is actively cleaning while the other is automatically cleaning itself, by back blowing bag filters. This method may work on timed cycle, or by pressure switch, when predetermined pressure build up occurs, the switch from filtering to cleaning happens automatically.

On FIG. #11, Item #2, is the induced draft blower, this blower will be controlled by variable speed drive, to control blower speed and volume, so as to balance draft along with drop-out cyclone pressure, so not to create negative pressure in flow zone.

On FIG. #11, Item #3, is a Rankine Cycle waste heat recovery system. It will capture waste heat via heat exchanger, and transfer that heat to useful energy via a turbo-expander coupled to an electrical generator. The system is self enclosed, and the internal gas and/or fluid is looped internally, constantly re-circulating, attracting waste and expelling thru turbo-expander. Increasing overall efficiency.

On FIG. #11, Item #4, is the Oxidizer reformer, the catalyst is returned from fuel reformer #15 via the KAT Seal system, it is introduced in proper volumes (via speed and bucket and/or auger size) into the near bottom of the oxidizer reformer #4. Catalyst is met with updraft air from blower below, distributed air via an air distribution grid for even flow, catalyst is suspended and lifted by air, while regeneration is occurring, and catalyst is pneumatically transferred to the drop-out cyclone vessel, where the rate of air flow (feet per second; FPS) is dramatically reduced due to drop-out cyclone #7 vessel volume, and catalyst is "Dropped" by gravity into the vessel.

On FIG. #11, Item #5, is the Bed Blower for the oxidizer reformer #4, this air blower shall be for re-oxidization of catalyst in the chemical looping combustion system. The oxidizer blower may have a variable speed drive for optimum FPS control, so as to not over nor under speed air flow thru oxidizer reformer.

On FIG. #11, Item #6, is the KAT SEAL System. There are two (2) Kat Seal systems on this chemical looping combustion system. Similar, but different seal and/or isolation is created. One seal is between the drop-out cyclone #7 and the fuel reformer #15. Another seal is between the fuel reformer #15 and the oxidizer reformer #4. The KAT SEAL systems may use single axle drive as per drawing on displayed FIG. #21 or on FIG. #22, both single shaft designs will lift measured quantities of catalyst from lower section, and deposit and/or drop off into oxidizer chute via gravity. The KAT SEAL system may also use duel (2) axle system as per drawing displayed on FIG. #23 or on FIG. #24; both duel axle and/or two shaft designs will lift measured quantities of catalyst from lower section, and deposit and/or drop off into oxidizer chute via gravity. All four; FIG. #21, 22, 23, 24 may be powered by electric motor(s), hydraulic motor(s), pneumatic drive(s), all may use gear reduction or direct drive, chain drive, all may use variable speed drives for operational speed control, all may be positioned from horizontal axis up to vertical axis, thus every angle in a 180* range is available to system, for gravity assist. Bucket and auger and/or screw size may vary, since system has scalable out-put, the sizes will be adjusted accordingly. The KAT SEAL System may have optional air jets, these air jets will assist if catalyst is stubborn or may have moisture contained, causing blockage, jets will assist breaking blockage to resume normal catalyst transfer.

On FIG. #11, Item #7, this is the Drop-Off Cyclone, air flow FPS is reduced as air from oxidizer reformer #4 is transitioned into Drop-off cyclone #7, this acts as a pneumatic transfer, and the catalyst is no longer air-born, and drops via gravity into the #6 KAT SEAL System, re-dux catalyst will then be used at first as a seal, then the KAT SEAL systems will transfer catalyst into the #15 fuel reformer.

On FIG. #11, Item #8, this is the steam drum, this chemical looping combustion system will generate heat, and the water walls and optional wing walls in the two (2) reformers will transfer heat and/or steam into the upper steam drum. The entire chemical looping combustion system is scalable, therefore the steam drum size will vary accordingly.

On FIG. #11, Item #9, this is the distillation exchanger. This uses incoming boiler feed water, to cool steam from the steam drum, creating distilled pure water. This distilled water will be used to cool the exit steam, a form of attemperation, lowering the temperature while maintaining steam pressure; utilizing an inline sparger, with-in the exit steam line, prior to entering the steam turbine #12.

On FIG. #11, Item #10, these are optional pre and post superheaters. If steam from drum is saturated and requires further heating, a pre and/or post superheater option is available.

On FIG. #11, Item #11, is an electrical generator, this generator is powered by the shaft out-put power of the steam turbine. The chemical looping combustion system is scalable in size, therefore out-put shaft horse power and/or generator will also require proper sizing.

On FIG. #11, Item #12, is the steam turbine, this turbine is powered by pounds per hour of steam produced by the chemical looping combustion system. System Size is scalable, therefore steam turbine is scalable.

On FIG. #11, Item #13, is a Rankine Cycle waste heat recovery system. It will capture waste heat via heat exchanger, and transfer that heat to useful energy via a turbo-expander coupled to an electrical generator. The system is self enclosed, and the internal gas and/or fluid is looped internally, constantly re-circulating, attracting waste and expelling thru turbo-expander. Increasing overall system efficiency.

On FIG. #11, Item #14, is a steam methane reformer (SMR), with-in the fuel reformer. The SMR has a natural gas feed, and with-in the process natural gas is cracked and/or reformed in various gas's, such as Hydrogen, Carbon Dioxide, carbon Monoxide, propane, butane, ethane, hydrogen sulfide. These hot gases will exit, and waste heat recovered by #25 Rankine Cycle heat exchanger, and gas's will be further processed and/or separated.

On FIG. #11, Item #15, is the fuel reformer, the feeds into this reformer are as follows: Natural Gas, Oxygen, PSA #22 by-products, air, catalyst from #7 drop-out cyclone. The chemical combustion reaction occurs few feet up from the bottom, where gas's and catalyst meet. The exit gas is mainly carbon dioxide and water vapor, which leaves via suction from Carbon Capture System #17. The other exit path is to KAT SEAL system #6, seal from fuel reformer #15 to oxidizer #4.

On FIG. #9, Item #16, is a Rankine Cycle waste heat recovery system. It will capture waste heat via heat exchanger, and transfer that heat to useful energy via a turbo-expander coupled to an electrical generator. The system is self enclosed, and the internal gas and/or fluid is looped internally, constantly re-circulating, attracting waste and expelling thru turbo-expander. Increasing overall system efficiency.

On FIG. #11, Item #17, is the Carbon Dioxide capture and separate system. This system will separate the carbon dioxide and water via a knock out drum with an internal demister pad, then pass thru an alternating desiccant drier system to dehydrate CO2, then it will refrigerate and convert to liquid carbon dioxide and place into #18 exchangeable storage tanks with self contained refrigeration units to maintain liquid CO2, with out venting. Power must be available near-by to power refrigeration system. This pure CO2 has some secondary markets.

On FIG. #11, Item #19, this is a Liquid Hydrogen Storage tank with self contained refrigeration unit to re-liquefy vapor pressure build-up, back to Liquid Hydrogen. Power must be available near-by to power refrigeration system. This is pure dehydrated Hydrogen, this product has market demand.

On FIG. #11, Item #20, this is a Hydrogen liquefaction unit, the Hydrogen gas from Storage Tank #21, is refrigerated and Hydrogen gas is liquefied and transferred into exchangeable tank #19.

On FIG. #11, item #21, this is Pure Hydrogen Gas from Chemical Looping Combustion process system, this gas will be used as fuel for the fuel cell #27 or it will be liquefied by #20 and sent to exchangeable storage tank #19 for resale.

On FIG. #11, Item #22, this is the Pressure Swing Absorbers, one is in service, while other is exhausting by-products into #15 fuel reformer. While one is in service, the Gas mixture is sent up the absorber, and the palladium catalyst, which separates out Hydrogen gas up to top, and by-products are separated out to fuel reformer.

On FIG. #11, Item #23, is the saturated pure water steam injection. This process, using ultra-pure water, increases Hydrogen production.

On FIG. #11, Item #24, this is the water purification system. Water is filtered by carbon filter, then de-mineralized, then de-ionized, then reverse osmosis process, and treated with Ultraviolet light to produce ultra pure 0.0 micro-siemens water. This is expensive water, it takes 4 gallons of water to make 1 gallon of purified water. This purified water is for Hydrogen production via saturated steam.

On FIG. #11, Item #25, is a Rankine Cycle waste heat recovery system. It will capture waste heat via heat exchanger, and transfer that heat to useful energy via a turbo-expander coupled to an electrical generator. The system is self enclosed, and the internal gas and/or fluid is looped internally, constantly re-circulating, attracting waste and expelling thru turbo-expander. Increasing overall system efficiency.

On FIG. #11, Item #26, is a Rankine Cycle waste heat recovery system. It will capture waste heat via heat exchanger, and transfer that heat to useful energy via a turbo-expander coupled to an electrical generator. The system is self enclosed, and the internal gas and/or fluid is looped internally, constantly re-circulating, attracting waste and expelling thru turbo-expander. Increasing overall system efficiency.

On FIG. #11, Item #27, is a Fuel Cell, there are multiple different fuel cell(s) with different internals, this application includes multiple fuel cells that use Hydrogen Gas and oxygen feed to increase efficiency. This fuel cell shall also have an air feed, via compressed air, and oxygen may be mixed with air, or separate oxygen inlet, plus an oxygen concentrator may also be used to increase oxygen percentage in the air inlet system. This oxygen concentrator may also be use for fuel reformer inlet also.

On FIG. #11, Item #28, is a liquid oxygen storage tank. This exchangeable storage tank may be used to feed oxygen (vapor via vaporizer #29) to the fuel reformer #15 and the fuel cell #27. Load cells may be used to measure exchangeable tank(s) weight; for each exchangeable tank with-in this system.

On FIG. #11, Item #29, this is the Liquid oxygen vaporizer, this provides ambient heat to liquid oxygen from storage tank #28, and converts it to oxygen vapor.

Figure 12:
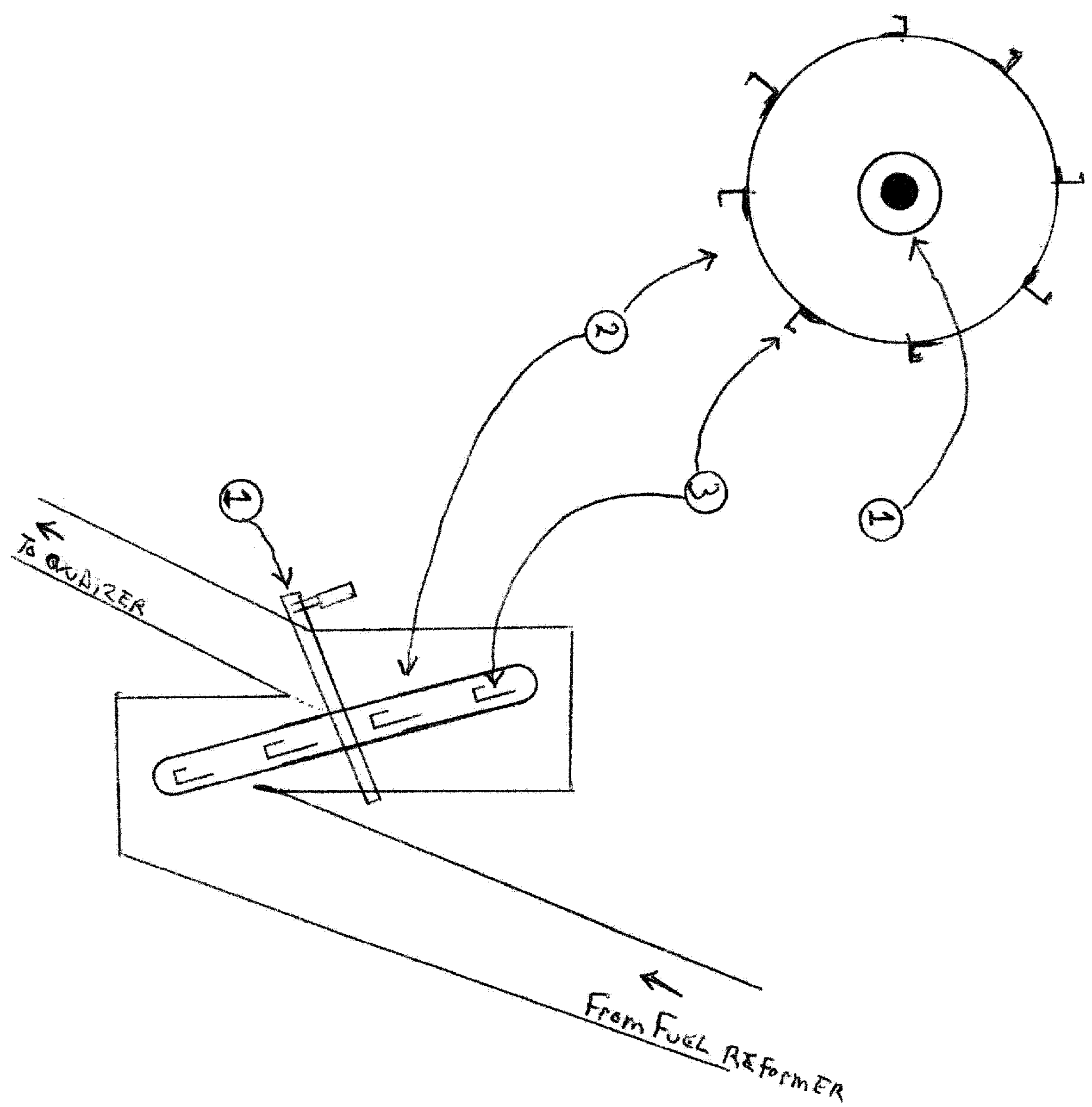
FIG. 12 shows a bucket wheel configuration in an IRCLCS.
Figure 13:
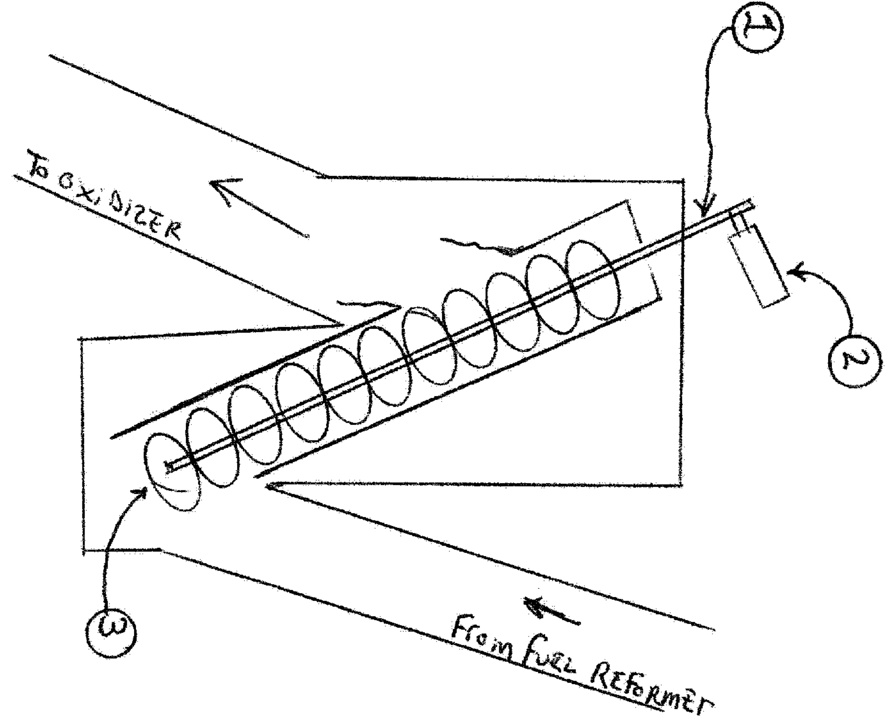
FIG. 13 shows a screw lift configuration in an IRCLCS.
Figure 14:
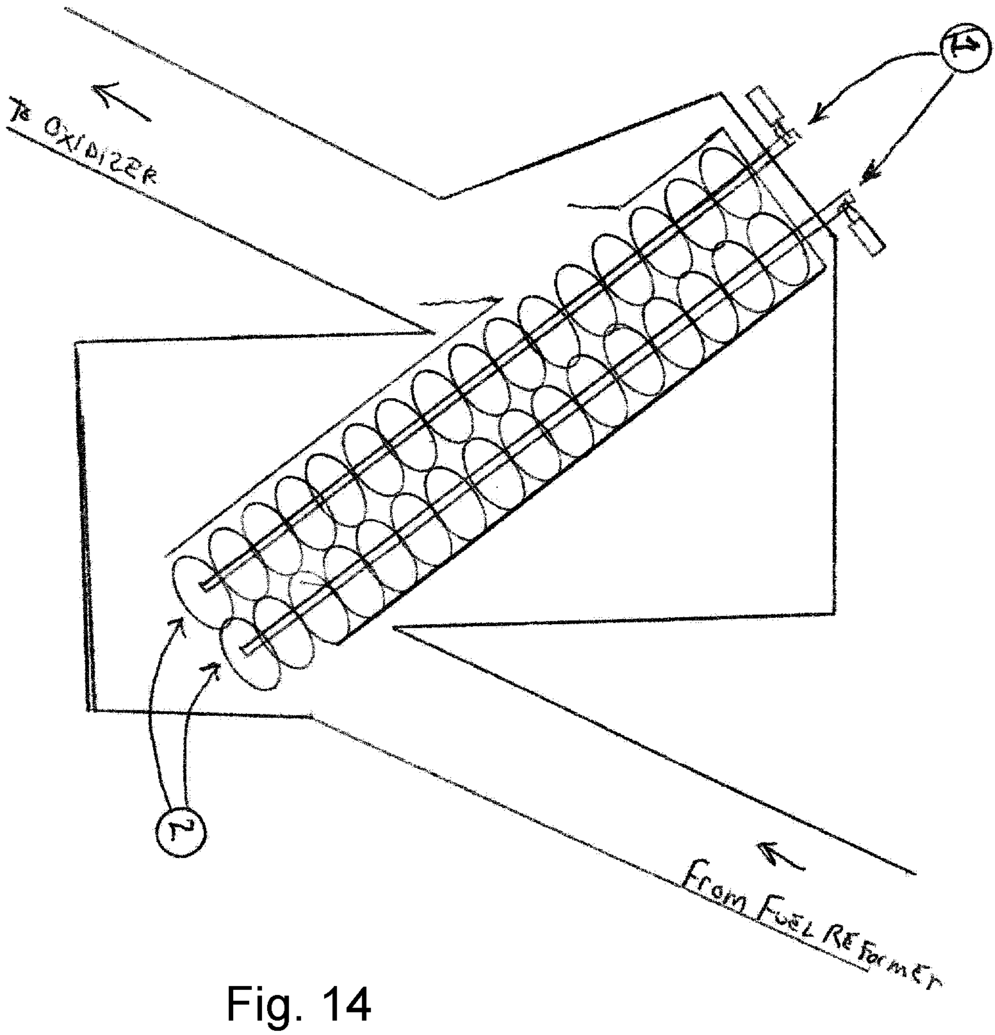
FIG. 14 shows a double screw lift configuration in an IRCLCS.
Figure 15:
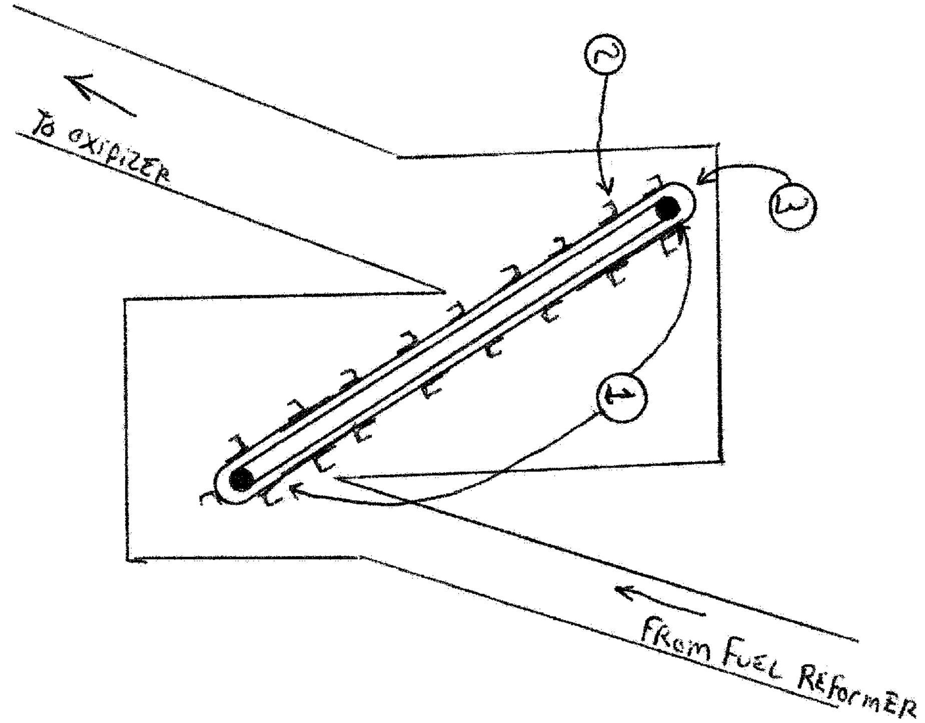
FIG. 15 shows a belt lift configuration in an IRCLCS.
Figure 16:
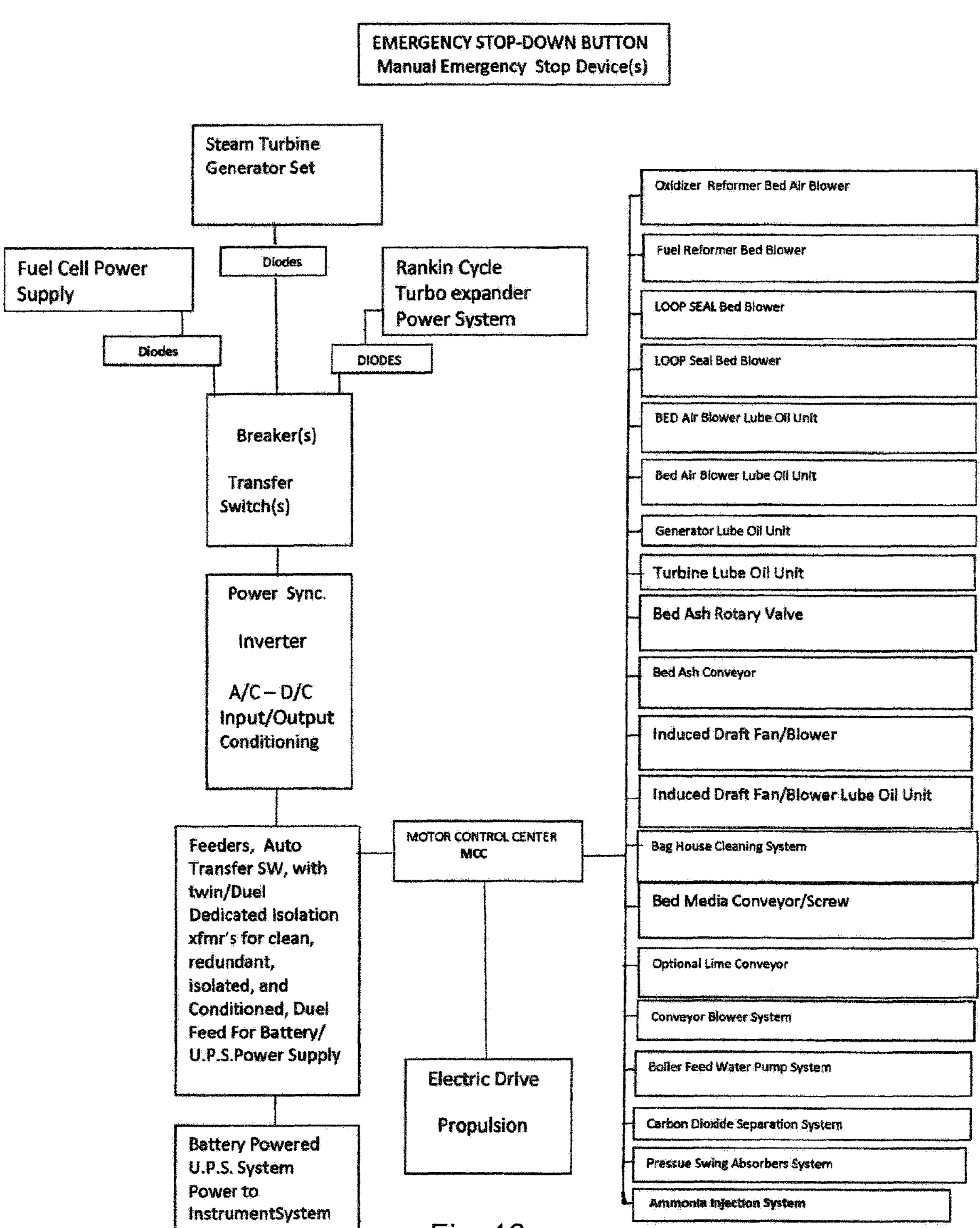
FIG. 16 is a block diagram of a safety shutdown system.

FIG. #11 shows a schematic of the Onboard Internally Recirculating Chemical Looping Combustion System (IRCLCS). FIG. 12 shows a bucket wheel in IRCLCS. FIG. 13 shows a screw lift in IRCLCS. FIG. 14 shows a double screw lift in IRCLCS. FIG. 15 shows a belt lift in IRCLCS. FIG. 16 is a block diagram of a safety shutdown system.

Two (2) Hopper feeders, both with bottom outlet to screw conveyor(s), located at an elevation of at least half distance up on rear (left) side of Oxidizer reformer #4, for gravity assist. The screw and/or auger conveyors will feed into oxidizer reformer #4 thru pneumatically operated slide gate valve(s) with air seal.

One (1) hopper feeder will supply fresh catalyst into #4 oxidizer reformer, at an elevation close to KAT SEAL #6 entrance elevation. One (1) hopper feeder will supply fresh lime, for Sulphur management, into #4 oxidizer reformer, at an elevation close to KAT SEAL #6 entrance elevation On the underside of fuel reformer #15; a pneumatically operated slide gate valve with air seal, which has another rotary valve inline below the slide gate, which will meter out spent catalyst and/or ash from system. The rotary valve may be electric, hydraulic, or pneumatic operated.

The chemical looping combustion system catalyst is prone to Sulphur poisoning, therefore Liquefied Natural gas is the preferred fuel. If pipeline Natural gas is to be used; it must be pretreated to remove Sulphur, Mercury, and Hydrogen Sulfide, as these are toxic to the catalyst with-in the system.

Also, auxiliary SMR reformers may be on stand-by, if steam turbine power is not necessary, multiple steam reform methane reformers may be used to create more Hydrogen, for resale. Logistic will be figured into when this production is required. Such as long port call, since chemical looping combustion process is a steady state continuous process, it is best to utilize steam, if turbine power is not needed.

The Internally Re-Circulating Chemical Looping Combustion System provides clean efficient power, with near and/or zero emissions. Evolving, Emerging, and merging old and new technologies will provide safe, clean, affordable $21^{st}$ century vehicles, for work, transits, and recreation.

The invention claimed is:

1. A fueling or fuel transfer data communications and signal detection system configured for communicating system data and signals, transmitting shutdown signals and activating alarms, by wire or wirelessly by radio or light, or quantum communications, over local-area or wide-area, including cloud-based, networks, data centers, network operation centers, or satellites, and configured for activating alarms concerning fueling or fuel transfer shutdown events, comprising:

a plurality of data communication satellites forming a satellite mesh data communications and processing system, wherein satellites communicate satellite to satellite, or satellite to ground, and utilize a combination of one or more onboard processors chosen from one or more of the group comprising: CPUs, GPUs, GPGPUs, OPUs, QPUs;

wherein, at least two different satellite communication signals are utilized within the satellite mesh communications system to or from a ground station, the at least two different satellite communication signals chosen from the group of: radio signals, modulated radio signals and optical signals;

wherein, if any one of the at least two different satellite communication signals is dropped or non-functioning, the system continues communications with at least one of the satellite communication signals;

wherein, if only one of the at least two different satellite communication signals is operable, a communication failure signal is produced which alarms any fueling or fuel transfer in progress of a communication fault; and wherein if two of the at least two different satellite communication signals are dropped or non-functioning, a communication failure alarm is produced, and any fueling or fuel transfer in progress is shut down using data communications to supplier or receiver systems.

2. The fueling or fuel transfer data communications and signal detection system of claim 1, wherein in the event the communication failure signal is produced, one or more of the at least two different satellite communications signals must be reestablished or reset in order to continue fueling or fuel transfer operations.

3. The fueling or fuel transfer data communications and signal detection system of claim 1, wherein the satellite mesh communications system includes inter or intra or multi-route data communications or signaling between satellites or processors, and wherein the satellites, networks, data centers or network operation centers include one or more network interfaces allowing processors and networks to interface and communicate, and wherein the data communications utilize high bandwidth communicating over multiple wavelengths or multiple frequencies.

4. The fueling or fuel transfer data communications and signal detection system of claim 3, wherein satellites in the satellite mesh communications system communicate with vehicles being fueled or transferring fuel, and wherein the vehicles are chosen from the group consisting of one or more spaceships, ships, trucks, barges, locomotives, and fuel transfer systems or stations.

5. The fueling or fuel transfer data communications and signal detection system of claim 1, wherein satellites in the satellite mesh communications system are configured for bi-directional data communications with cellular networks, data centers or data center networks, network operation centers, or vehicle or vehicle networks.

6. The fueling or fuel transfer data communications and signal detection system of claim 1, wherein the satellite mesh communications system communicates bi-directionally with wide area or local area data networks, and wherein at least one of the wide area networks or local area networks is connected to one or more fueling or fueling transfer control systems.

7. The fueling or fuel transfer data communications and signal detection system of claim 6, wherein the fueling or fueling transfer control systems include data connection to one or more subsystems chosen from the group consisting of one or more of: a fire detection system, a fire suppression system, a power monitoring system, a communication monitoring system, a video monitoring system, a vehicle motion system, a gas detection system, an explosion detection system, a vehicle lock-out system, an oxygen detection system, or a transfer or fueling system which, in the event of encountering abnormalities concerning fuel temperature, pressure, level flow, gas detection, vehicle motion, power, fire detection, or communication interruptions, is configured to cease operations.

8. The fueling or fuel transfer data communications and signal detection system of claim 1, wherein at least one subsystem in a fueling or fuel transfer system communicates emission data or an emission profile to LAN, WAN, or the satellite mesh communications system, whereby said emission data or emission profile can be accessed by authorities to track clean fueling or fuel transfer, and wherein vehicle emissions data is accessible by one or more data communication networks and by authorities to track vehicle emissions.

9. The fueling or fuel transfer data communications and signal detection system of claim 1, further comprising an optical or radio signal automatic satellite detection or alignment system for detecting or aligning optical or radio transmission or receiving equipment between satellites, ground stations or vehicles.

10. The fueling or fuel transfer data communications and signal detection system of claim 1, wherein at least one spacecraft communicates information pertaining to one or more of docking, secure connections, fuel, fuel transfer or oxidizer tank data, with another spacecraft using communication systems, via satellites, ground stations, or by vehicle-to-vehicle directly, wirelessly by radio or light.

* * * * *